(12) United States Patent
Yamada et al.

(10) Patent No.: US 8,376,851 B2
(45) Date of Patent: Feb. 19, 2013

(54) STORAGE MEDIUM HAVING GAME PROGRAM STORED THEREIN AND GAME APPARATUS

(75) Inventors: Yoichi Yamada, Kyoto (JP); Daiki Iwamoto, Kyoto (JP); Shirou Mouri, Kyoto (JP); Hiromasa Shikata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 269 days.

(21) Appl. No.: 12/555,360

(22) Filed: Sep. 8, 2009

(65) Prior Publication Data

US 2010/0304859 A1     Dec. 2, 2010

(30) Foreign Application Priority Data

May 28, 2009   (JP) .................................. 2009-129701

(51) Int. Cl.
    *A63F 13/00*        (2006.01)
    *A63F 9/24*         (2006.01)

(52) U.S. Cl. .......................................... 463/36; 463/31

(58) Field of Classification Search ................ 463/1, 31, 463/37, 36
See application file for complete search history.

(56) References Cited

U.S. PATENT DOCUMENTS

| | | | | |
|---|---|---|---|---|
| 4,862,373 A * | 8/1989 | Meng | ............................. | 701/209 |
| 5,687,969 A * | 11/1997 | Logan | ............................ | 273/255 |
| 6,057,845 A * | 5/2000 | Dupouy | ........................ | 715/863 |
| 6,259,988 B1 * | 7/2001 | Galkowski et al. | ............ | 701/202 |
| 6,273,818 B1 * | 8/2001 | Komoto | ........................... | 463/31 |
| 7,093,202 B2 * | 8/2006 | Saund et al. | ................... | 715/863 |
| 2003/0195039 A1 * | 10/2003 | Orr et al. | ........................... | 463/31 |
| 2006/0094502 A1 * | 5/2006 | Katayama et al. | ............... | 463/31 |
| 2006/0252531 A1 * | 11/2006 | Kando et al. | ..................... | 463/30 |
| 2007/0018968 A1 * | 1/2007 | Iwamoto et al. | ............... | 345/173 |
| 2007/0060231 A1 * | 3/2007 | Neveu et al. | ....................... | 463/5 |
| 2007/0105626 A1 * | 5/2007 | Cho et al. | ......................... | 463/37 |
| 2007/0265082 A1 * | 11/2007 | Shimura et al. | .................. | 463/37 |
| 2008/0146328 A1 * | 6/2008 | Ishii et al. | ........................ | 463/31 |

(Continued)

FOREIGN PATENT DOCUMENTS

JP      2007-26129      2/2007

OTHER PUBLICATIONS

"Instruction Manual of Kirby Canvas Curse", Nintendo Co., Ltd., Jun. 13, 2005, pp. 1 to 25.*

(Continued)

*Primary Examiner* — William Brewster
*Assistant Examiner* — Jason Skaarup
(74) *Attorney, Agent, or Firm* — Nixon & Vanderhye P.C.

(57) ABSTRACT

A game apparatus includes an input device with which it is possible to specify a position on a screen of a display device. The game apparatus displays a game image representing a virtual game space on the display device. The movement of a first object in the game image is controlled based on an input made on the game image by using the input device. The game apparatus detects a path inputted on the game image by using the input device. The game apparatus moves a second object in the game image along the path.

15 Claims, 17 Drawing Sheets

U.S. PATENT DOCUMENTS

| | | | |
|---|---|---|---|
| 2008/0234022 A1* | 9/2008 | Suzuki et al. | 463/4 |
| 2009/0093304 A1* | 4/2009 | Ohta | 463/36 |
| 2009/0104990 A1* | 4/2009 | Tsujino et al. | 463/32 |
| 2009/0163275 A1* | 6/2009 | Ishii et al. | 463/31 |
| 2009/0170579 A1* | 7/2009 | Ishii et al. | 463/2 |
| 2009/0170599 A1* | 7/2009 | Osumi et al. | 463/31 |
| 2009/0197686 A1* | 8/2009 | Bergelt et al. | 463/43 |
| 2010/0022304 A1* | 1/2010 | Katayama et al. | 463/31 |

OTHER PUBLICATIONS

"Instruction Manual of The Legend of Zelda: Phantom Hourglass", Nintendo Co., Ltd., Oct. 1, 2007, pp. 1 to 38.*

"Instruction Manual of The Legend of Zelda: Phantom Hourglass (Mugen No Sunadokei)", Nintendo Co., Ltd., Jun. 23, 2007, p. 32), with partial English translation.

* cited by examiner

STORAGE MEDIUM HAVING GAME PROGRAM STORED THEREIN AND GAME APPARATUS

CROSS REFERENCE TO RELATED APPLICATION

The disclosure of Japanese Patent Application No. 2009-129701, filed May 28, 2009, is incorporated herein by reference.

BACKGROUND OF THE INVENTION

1. Field of the Invention

The present invention relates to a storage medium having stored therein a game program and a game apparatus, and more particularly to a storage medium having stored therein a game program and a game apparatus in which an object, being a controlled object, is moved along a path inputted on a screen.

2. Description of the Background Art

There is a conventional technique in which an object (player character), being a controlled object, is moved by using a path that is inputted on the screen by the player. For example, in a game apparatus described in Patent Document 1 (Japanese Laid-Open Patent Publication No. 2007-26129), a relatively large area of a virtual game space (map screen) is displayed on a display screen having a touch panel thereon, and the player can input a path on the map screen. The game apparatus controls the object so as to move the object along the path inputted on the map screen. When the object is moving, the game apparatus displays an area (of the virtual game space) that is smaller than the map screen as the main screen, and how the object is moved is displayed on this main screen. As described above, by moving the object using a path inputted on the screen, the player can specify a course of movement of the object through an intuitive operation.

In the game apparatus described in Patent Document 1, the player controls two objects, i.e., a player character and an item object. That is, the player moves a predetermined item object by inputting the path on the touch panel, while controlling the player character by using the touch panel. When controlling the player character, the main screen is displayed on the display screen so that the player can grasp in detail the movement of the player character. When controlling the item object, the map screen is displayed on the display screen so as to allow the player to input a path, as described above. In the game apparatus, as described above, it is necessary to switch the screen between the map screen and the main screen each time the object to be the controlled object is switched from one to another. Therefore, in order to control an item object by a path, the player needs to perform a time-consuming operation of first switching the screen and then drawing a path.

SUMMARY OF THE INVENTION

Therefore, an object of the present invention is to provide a storage medium having stored therein a game program and a game apparatus in which the player can easily perform an operation of moving an object by a path on the screen, in a case where a plurality of objects are controlled.

The present invention has the following features to attain the object mentioned above. Note that the reference numerals, the supplementary description and the like in the parentheses indicate a correspondence with the embodiment described below in order to aid in understanding the present invention and are not intended to limit, in any way, the scope of the present invention.

The present invention is directed to a computer-readable storage medium having stored therein a game program (71) to be executed by a computer (the CPU 31) in a game apparatus (1) including an input device (the touch panel 13) with which it is possible to specify a position on a screen of a display device. The program causes the computer to function as display control means (the CPU 31 performing step S8; hereinafter, only step numbers will be indicated), first object control means (S6), path detection means (S2), and second object control means (S7). The display control means displays a game image (game space image) representing a virtual game space on the display device (the lower LCD 12). The first object control means controls an action of a first object (51) in the game image based on an input made on the game image by using the input device. The path detection means detects a path inputted on the game image by using the input device. The second object control means moves a second object (52) in the game image along the path.

With such a configuration, the input of a path for moving the second object therealong is accepted on the game image, on which an input for controlling the action of the first object is made. In this way, the player can control an object looking at the same game image whether the player is controlling the first object or the second object. Therefore, with such a configuration, the player can easily perform an operation of inputting a path, without having to switch the screen between the main screen and the map screen as with conventional techniques. That is, the player can easily perform an operation of moving an object by a path on the screen, in a case where a plurality of objects are controlled.

The game program may cause the computer to further function as path display means (S78) for displaying the path, superimposed on the game image.

With such a configuration, the player can visually check the shape of a path that has been inputted by the player on the screen on which the player has inputted the path. The player can visually check, on the screen, the path along which the second object moves. In this way, the player can control the first object while estimating the course of movement of the second object, and it is therefore possible to easily control two objects.

The game program may cause the computer to further function as designated area setting means (S37) for setting a designated area based on a position of the second object in the virtual game space. In this case, if a position of an input made on the game image is within the designated area (YES in S16), the second object control means moves the second object along a path that is represented by an input that is continuing from the input within the designated area (S7). If a position of an input made on the game image is outside the designated area (NO in S16), the first object control means controls an action of the first object based on the input. Note that the phrase "a path that is represented by an input that is continuing from the input within the designated area" refers to a path made up of (points of) input positions of an input that is continuously made, starting from a position within the designated area. Specifically, if the starting position of a continuous input is within designated area, this phrase refers to a path that is represented by the entire input. If a position midway through a continuous input is within the designated area, this phrase refers to a path that is formed by the midway position and input positions subsequent thereto.

With such a configuration, whether to control the second object or the first object based on an input is determined depending on whether the input position is inside or outside the designated area. Where two objects are controlled with only one input device, in order to determine the object to be controlled by an input made on the input device, it is typically necessary to perform, before making the input, an operation of specifying the controlled object (or switching the controlled object from one to another). In contrast, with such a configuration as described above, since the controlled object is determined depending on the input position, the player does not need to perform an operation only for switching controlled objects from one to another, thus making it easier to control two objects.

The display control means may display an image representing the designated area (the path mark 53), superimposed on an image of the second object in the game image.

With such a configuration, the player can clearly perceive the boundary of the designated area. In this way, since the player will not mistake the boundary, the player can reliably control the object, which the player intends to control, and the player will not inadvertently control an unintended object. As described above, with such a configuration, it is possible to provide a game with a good controllability.

The designated area setting means may move the designated area, together with the second object, along the path (S37). In this case, if a new input starting from a position within the designated area is made by using the input device while the second object is moving along a path, the second object control means moves the second object along a path represented by an input that is continuing from the new input within the designated area.

With such a configuration, if the player newly inputs a different path while the second object is moving along a path, the second object moves along the new path. Therefore, the player can change the path while the second object is moving along the path. Therefore, if the player inadvertently inputs an unintended path, or if the player wishes to change the destination of the second object while the first object is performing an action, the player can readily correct the path. As described above, with such a configuration, it is possible to provide a game with a good controllability.

The first object control means may move the first object based on an input made on the game image by using the input device.

With such a configuration, the player can easily move the first object by only specifying the input position. It is possible to control two objects, i.e., the first object and the second object, with a single input device. Therefore, the player can easily perform an operation of moving the two objects without having to change the input device (input method) when switching the controlled object between the two objects.

The first object control means may control the first object to perform an action each time an input made on the game image by using the input device is detected. In this case, the second object control means moves the second object each time the input of the path is completed.

With such a configuration, the first object performs an action immediately in response to an input made on the input device, whereas the second object performs an action (or moves) when an input of a path on the input device is completed. That is, with such a configuration, when the player makes an input, the first object performs an action immediately in response to the input, whereas the second object performs an action after the input is completed. As described above, the timing at which the second object responds to a player's input is made later than the timing for the first object, and it is therefore possible to control the first object to perform an action even while the second object is moving. Therefore, with such a configuration, although the game apparatus controls the actions of the two objects by switching the controlled object from one to another depending on the input made on the input device, the two objects can be controlled to perform actions at the same time. Thus, the game apparatus can make the player feel as if the player were controlling two objects at the same time.

If a predetermined instruction is given by a player (YES in step S12), the second object control means may control the movement of the second object based on a position of the first object (S36).

With such a configuration, the player can not only move the second object along the path, but also move the second object in accordance with the movement of the first object. For example, it is possible to move the second object so as to follow the first object, or to move the second object in a synchronized manner with the first object. With such a configuration, it is possible to increase the variety of ways of moving the second object, which makes it even easier for the player to control the second object.

If the predetermined instruction is given by the player, the second object control means moves the second object to the position of the first object, and then moves the second object so as to follow the first object whose action is controlled by the first object control means.

With such a configuration, in response to the predetermined instruction, the second object will move following the first object. Therefore, with such a configuration, the player can not only control two objects separately, but can also control the two objects together in a single operation.

The game program causes the computer to further function as designated area setting means (S37) for setting a designated area (the path mark 53) based on a position of the second object in the game image. In this case, the display control means displays a predetermined image on the game image (S73 and S75) so that the predetermined image is erased at least while an input starting from a position within the designated area is being made on the game image (YES in S71). The second object control means controls the movement of the second object by using an input made by the input device at a position of the predetermined image as the predetermined instruction.

With such a configuration, the predetermined image used for controlling the second object to move based on the position of the first object is not displayed while a path for moving the second object therealong is being inputted. That is, the predetermined image is not displayed when it is not needed, and it is therefore possible to prevent the player from erroneously making an input on the predetermined image and to provide a game image that is easier for the player to view.

The display control means may switch, based on an instruction from a player (an instruction made by touching the switch icon 54), between a state where a display area of a virtual game space is set so that the first object is included in the game image (S74 and S75) and another state where the display area is set so that the second object is included in the game image (S72 and S73).

In a case where the player is allowed to control two objects, one of the two objects may possibly move out of the display area of the display device so that both of the objects cannot be displayed at the same time, depending on the circumstances in the game. In contrast, with such a configuration as described above, even in such a case, the player can easily keep displayed one of the two objects that the player wishes to be displayed (one that the player wishes to control).

The display control means may selectively display one of, or simultaneously display both of, the game image (game space image) and a wide-area image (map image) representing a larger area than an area of a game space represented by the game image, on the display device (S79).

With such a configuration, an image representing a larger game space than the area of the game space represented by the game image is displayed, in addition to the game image in which objects are controlled. In this way, the player can more easily grasp the positional relationship of the inputted path (in the game space), and can more easily input a path.

The display control means may display a path used for moving the second object, superimposed on the wide-area image (FIG. 10, S78).

With such a configuration, the player can visually check an inputted path also on the wide-area image representing a larger area than the game image on which the input has been made, and can more easily input a path.

The present invention may be embodied as a game apparatus having similar functions to those of the game apparatus set forth above. Note that in such a game apparatus, the various means may be implemented by a CPU executing a game program, or some or all of the various means may be implemented by a dedicated circuit or circuits of the game apparatus.

According to the present invention, an input of a path for moving a second object therealong is accepted on a game image, on which an input for controlling an action of a first object is made. Thus, the player no longer needs to perform a screen-switching operation between two images, thereby allowing the player to easily perform an operation of inputting a path.

These and other objects, features, aspects and advantages of the present invention will become more apparent from the following detailed description of the present invention when taken in conjunction with the accompanying drawings.

DESCRIPTION OF THE PREFERRED EMBODIMENTS

[Hardware Configuration of the Game Apparatus]

A game program and game apparatus according to an embodiment of the present invention will be described with reference to the drawings. While the present invention can be achieved by the present program being executed in any computer system capable of displaying a game image on a display device, the present embodiment will be described with respect to the case where a game apparatus 1 shown in FIG. 1 is used as an example of the game apparatus.

Figure 1:
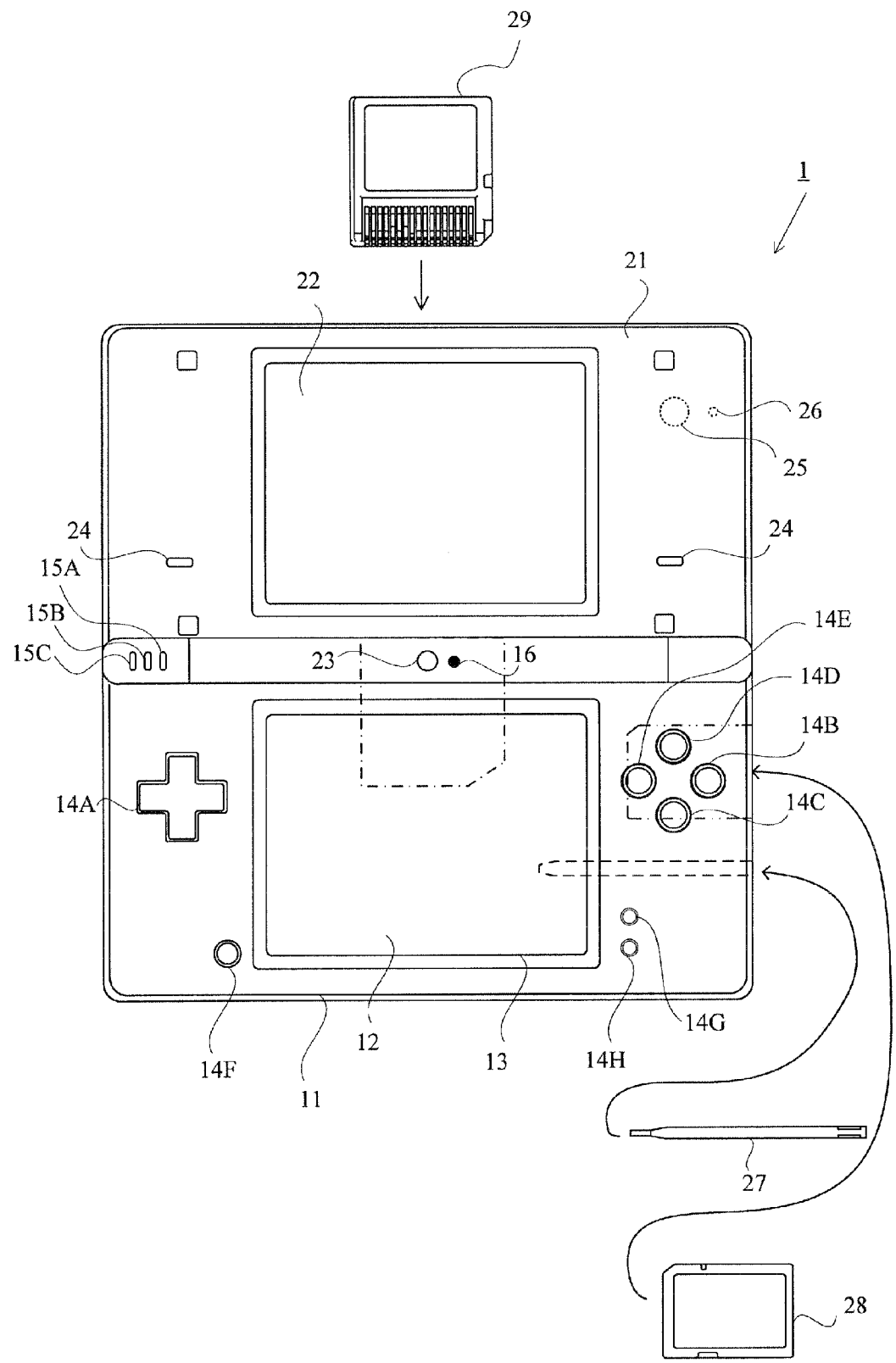
FIG. 1 is an external view of a game apparatus for executing a game program according to an embodiment of the present invention.

FIG. 1 is an external view of the game apparatus 1 for executing a game program according to the present embodiment. Here, a hand-held game apparatus is shown as an example of the game apparatus 1. Note that the game apparatus 1 includes a camera and functions as an imaging device for taking an image with the camera, displaying the taken image on the screen, and storing data for the taken image.

In FIG. 1, the game apparatus 1 is a foldable hand-held game apparatus, and the game apparatus 1 shown in the figure is unfolded (open state). The game apparatus 1 is structured in a size allowing the user to hold it with both hands, or even one hand, when unfolded.

The game apparatus 1 has a lower housing 11 and an upper housing 21. The lower housing 11 and the upper housing 21 are connected so as to be openable/closable (foldable). In the example of FIG. 1, the lower housing 11 and the upper housing 21 are each formed in the shape of a horizontally elongated rectangular plate, and connected so as to be pivotable at their common long side joint. Typically, the user uses the game apparatus 1 in open state. Also, when the user does not use the game apparatus 1, the game apparatus 1 is stored in closed state. In addition, in the example shown in FIG. 1, the game apparatus 1 can maintain not only the closed and open states but also its opening state via friction force generated at the joint at any angle that can be made by the lower housing 11 and the upper housing 21 between the closed and open states. That is, the upper housing 21 can remain stationary at an arbitrary angle with respect to the lower housing 11.

The lower housing 11 is provided with a lower LCD (Liquid Crystal Display) 12. The lower LCD 12 is horizontally long, and is arranged such that its longitudinal direction coincides with the longitudinal direction of the lower housing 11. Note that in the present embodiment, LCDs are used as display devices to be included in the game apparatus 1, but any other display devices, such as EL (Electro Luminescence) display devices, may be used. In addition, display devices of any resolution can be used for the game apparatus 1. Note that an image being taken by an internal camera 23 or an external camera 25 is displayed in real-time on lower LCD 12.

The lower housing 11 is provided with various operation buttons 14A to 14K and a touch panel 13 as input devices. As shown in FIG. 1, of all the operation buttons 14A to 14K, the direction input button 14A, the operation button 14B, the operation button 14C, the operation button 14D, the operation button 14E, the power button 14F, the start button 14G, and the select button 14H are provided at the inner principal surface of the lower housing 11, which is placed on the interior side when the upper housing 21 and the lower housing 11 are folded. In the example shown in FIG. 1, the direction input button 14A and the power button 14F are provided to the left or right (in FIG. 1, to the left) of the lower LCD 12 provided at the center of the inner principal surface of the lower housing 11. In addition, the operation buttons 14B to 14E, the start button 14G, and the select button 14H are provided to the opposite side (in FIG. 1, to the right) of the lower LCD 12 on the inner principal surface of the lower housing 11. The direction input button 14A, the operation buttons 14B to 14E, the start button 14G, and the select button 14H are used for various operations on the game apparatus 1. For example, the direction input button 14A is used for selection operations and so on. The operation buttons 14B to 14E are used for setting and cancellation operations and so on. The power button 14F is used for turning ON/OFF the game apparatus 1.

Note that in FIG. 1, the operation buttons 14I to 14K are not shown. For example, the L button 14I is provided at the left edge of the upper surface of the lower housing 11, and the R button 14J is provided at the right edge of the upper surface of the lower housing 11. For example, the L button 14I and the R button 14J are used for imaging instruction operations (shutter operations) on the game apparatus 1 having an imaging function. Furthermore, the volume button 14K is provided at the left side surface of the lower housing 11. The volume button 14K is used for controlling the volume of a speaker included in the game apparatus 1.

Also, in addition to the operation buttons 14A to 14K, the game apparatus 1 further includes another input device, a touch panel 13 allowing designation of an arbitrary position on the screen. The touch panel 13 is attached so as to cover the screen of the lower LCD 12. Note that in the present embodiment, a touch panel 13 is, for example, of a resistive film type. However, the touch panel 13 is not limited to the resistive film type, and may be of any type. Also, in the present embodiment, for example, the touch panel 13 has the same resolution (detection accuracy) as the lower LCD 12. However, the touch panel 13 is not necessarily required to be equal in resolution to the lower LCD 12. In addition, the lower housing 11 has an insertion opening (in FIG. 1, indicated by broken lines) provided in its right side surface. The insertion opening can store a touch pen 27 to be used for operating the touch panel 13. Note that any input to the touch panel 13 (touch input) is normally performed with the touch pen 27, but the touch pen 27 is not restrictive, and the touch panel 13 can be operated with the user's finger.

Also, the lower housing 11 has provided in the right side surface an insertion opening (in FIG. 1, indicated by two-dot chain lines) for storing a memory card 28. The insertion opening has provided therein a connector (not shown) for electrically connecting the game apparatus 1 and the memory card 28. The memory card 28 is, for example, an SD (Secure Digital) memory card removably attached to the connector. For example, the memory card 28 is used for storing (saving) images taken by the game apparatus 1 and reading into the game apparatus 1 images generated by other apparatuses.

Furthermore, the lower housing 11 has provided in its upper side surface an insertion opening (in FIG. 1, indicated by one-dot chain lines) for storing a memory card 29. This insertion opening also has provided therein a connector (not shown) for electrically connecting the game apparatus 1 and the memory card 29. The memory card 29 is a storage medium having a game program or suchlike stored therein, and is removably loaded into the insertion opening provided in the lower housing 11.

Three LEDs 15A to 15C are provided to the left of the joint between the lower housing 11 and the upper housing 21. Here, the game apparatus 1 is capable of wirelessly communicating with other equipment, and the first LED 15A is lit up while the game apparatus 1 is ON. The second LED 15B is lit up while the game apparatus 1 is being charged. The third LED 15C is lit up when wireless communication is established. Accordingly, the three LEDs 15A to 15C allow the user to know the statuses of the game apparatus 1, regarding ON/OFF of the power supply, battery charge, and communications.

On the other hand, the upper housing 21 is provided with an upper LCD 22. The upper LCD 22 is horizontally long, and is arranged such that its longitudinal direction coincides with the longitudinal direction of the upper housing 12. Note that as in the case of the lower LCD 12, any display device of any other type and resolution may be used instead of the upper LCD 22. Note that a touch panel may be provided over the upper LCD 22. The upper LCD 22 displays, for example, an operation instruction screen for teaching the user about the roles of the operation buttons 14A to 14K and the touch panel 13.

Also, the upper housing 21 is provided with two cameras (an internal camera 23 and an external camera 25). As shown in FIG. 1, the internal camera 23 is provided at the inner principal surface close to the joint of the upper housing 21. On the other hand, the external camera 25 is provided opposite to the side of the inner principal surface where the internal camera 23 is provided, i.e., the external principal surface of the upper housing 21 (the exterior surface of the game apparatus 1 in closed state; the back of the upper housing 21 shown in FIG. 1). Note that in FIG. 1, the external camera 25 is indicated by a broken circle. As a result, the internal camera 23 can take images of the direction in which the inner principal surface of the upper housing 21 is oriented, while the external camera 25 can take images of the direction opposite to the imaging direction of the internal camera 23, i.e., the direction in which the external principal surface of the upper housing 21 is oriented. In this manner, in the present embodiment, the two cameras, i.e., the internal and external cameras 23 and 25, are provided so as to take images in their respective directions opposite to each other. For example, the user can use the internal camera 23 to take images of a view from the game apparatus 1 toward the user, and also can use the external camera 25 to take images of a view in the opposite direction, i.e., from the user toward the game apparatus 1.

Note that a microphone (microphone 43 shown in FIG. 2) is provided as an audio input device under the inner principal surface close to the joint. In addition, a microphone hole 16 is provided in the inner principal surface close to the joint such that the microphone 43 can sense sound from outside the game apparatus 1. The microphone 43 and the microphone hole 16 are not necessarily required to be positioned at the joint. For example, the microphone 43 may be accommodated within the lower housing 11, and the microphone hole 16 may be provided in the lower housing 11 at a position corresponding to the position where the microphone 43 is accommodated.

Also, a fourth LED 26 (in FIG. 1, indicated by a broken circle) is provided at the external principal surface of the upper housing 21. The fourth LED 26 is lit up at the time the internal camera 23 or the external camera 25 takes an image (when the shutter button is pressed). Furthermore, the light is on while the internal camera 23 or the external camera 25 is taking a motion picture. As such, the fourth LED 26 allows any subject and bystander to know the game apparatus 1 took (or is taking) a picture.

Also, a sound hole 24 is provided to both the left and the right of the upper LCD 22 provided at the center of the inner principal surface of the upper housing 21. A speaker is accommodated within the upper housing 21 below each sound hole 24. The sound hole 24 is a hole for emanating the sound from the speaker to the outside of the game apparatus 1.

As described above, the upper housing 21 is provided with the internal and external cameras 23 and 25 configured to take images, as well as the upper LCD 22 acting as a display means for mainly displaying the operation instruction screen. On the other hand, the lower housing 11 is provided with the input devices (the touch panel 13 and the operation buttons 14A to 14K) for operational inputs to the game apparatus 1, and the lower LCD 12 acting as a display means for displaying taken images. Accordingly, when using the game apparatus 1, the user can see a taken image (an image taken by the camera) displayed on the lower LCD 12 and make inputs via the input devices while holding the lower housing 11.

Figure 2:
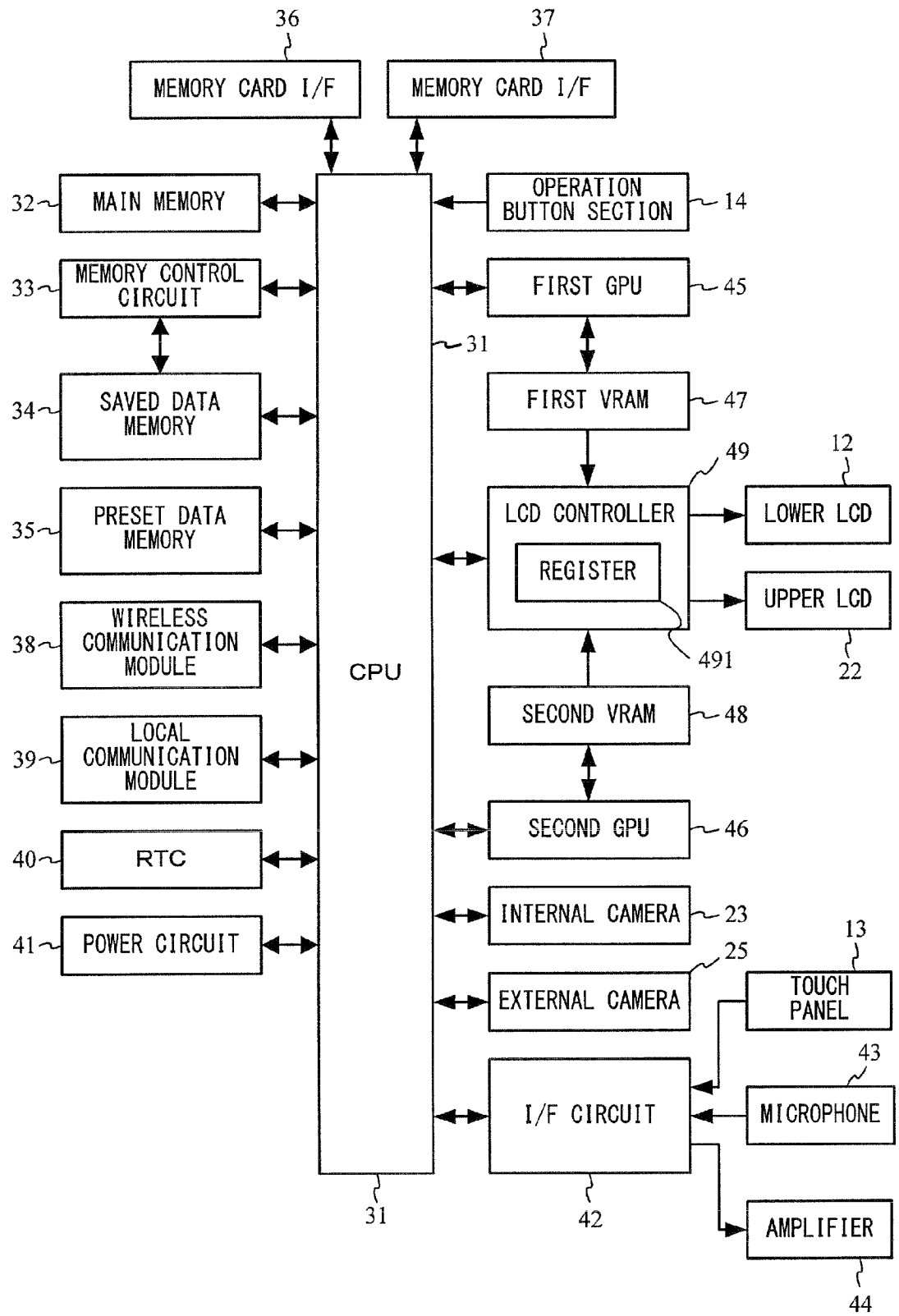
FIG. 2 is a block diagram illustrating an exemplary internal configuration of the game apparatus.

Next, an internal configuration of the game apparatus 1 will be described with reference to FIG. 2. FIG. 2 is a block diagram illustrating an exemplary internal configuration of the game apparatus 1.

In FIG. 2, the game apparatus 1 includes electronic parts, such as a CPU 31, a main memory 32, a memory control circuit 33, a saved data memory 34, a preset data memory 35, a memory card interface (memory card I/F) 36, a memory card I/F 37, a wireless communication module 38, a local communication module 39, a real time clock (RTC) 40, a power circuit 41, an interface circuit (I/F circuit) 42, a first GPU (Graphics Processing Unit) 45, a second GPU 46, a first VRAM (Video RAM) 47, a second VRAM 48, and an LCD controller 49. These electronic parts are mounted on an electronic circuit board, and accommodated within the lower housing 11 (or may be accommodated within the upper housing 21).

The CPU 31 is an information processing means for executing a predetermined program (here, a game program according to the present embodiment). In the present embodiment, the game program is stored in a memory (e.g., saved data memory 34) within the game apparatus 1 as well as in the memory card 28 and/or 29, and the CPU 31 executes the game program, thereby executing a game process to be described later. Note that the program to be executed by the CPU 31 may be prestored in the memory within the game apparatus 1 or may be acquired from the memory card 28 and/or 29 or from other equipment through communication therewith.

The CPU 31 is connected to the main memory 32, the memory control circuit 33, and the preset data memory 35. The memory control circuit 33 is connected to the saved data memory 34. The main memory 32 is a storage means used as a working area or buffering area for the CPU 31. Specifically, a main memory 32 stores various data to be used in the game process, and programs acquired from outside (e.g., the memory cards 28 and 29 and other equipment). In the present embodiment, for example, a PSRAM (Pseudo-SRAM) is used as the main memory 32. The saved data memory 34 is a storage means for storing, for example, the programs to be executed by the CPU 31 and data for images taken by the internal camera 23 and the external camera 25. The saved data memory 34 is configured by a nonvolatile storage medium, e.g., in the present embodiment, a NAND flash memory. The memory control circuit 33 is a circuit for controlling data reading from/writing to the saved data memory 34 in accordance with an instruction by the CPU 31. The preset data memory 35 is a storage means for storing data (preset data) such as various present parameters for the game apparatus 1. As for the preset data memory 35, a flash memory connected to the CPU 31 via an SPI (Serial Peripheral Interface) bus can be used.

The memory card I/Fs 36 and 37 are each connected to the CPU 31. The memory card I/F 36 reads/writes data from/to the memory card 28 attached to the connector in accordance with an instruction from the CPU 31. Also, the memory card I/F 37 reads/writes data from/to the memory card 29 attached to the connector in accordance with an instruction from the CPU 31. In the present embodiment, image data taken by the internal camera 23 and the external camera 25, as well as image data received from other devices are written into the memory card 28, and image data stored in the memory card 28 is read from the memory card 28 and stored to the saved data memory 34 or transmitted to other devices. In addition, various programs stored in the memory card 29 are read and executed by the CPU 31.

Note that the game program of the present invention may be supplied to a computer system not only via an external storage medium, such as the memory card 29, but also via a wired or wireless communication line. Also, the game program may be pre-recorded to a nonvolatile storage device within the computer system. Note that the information storage medium for storing the game program is not limited to the nonvolatile storage device, and may be a CD-ROM, a DVD, or a similar optical disk storage medium.

The wireless communication module 38 has a function of connecting to a wireless LAN in accordance with a system complying with, for example, the IEEE802.11.b/g standard. Also, the local communication module 39 has a function of wirelessly communicating with similar game apparatuses in accordance with a predetermined communication system. The wireless communication module 38 and the local communication module 39 are connected to the CPU 31. The CPU 31 is capable of transmitting/receiving data to/from other equipment via the Internet using the wireless communication module 38, as well as transmitting/receiving data to/from other similar game apparatuses via the Internet using the local communication module 39.

The CPU 31 is also connected to the RTC 40 and the power circuit 41. The RTC 40 counts time and provides an output to the CPU 31. For example, the CPU 31 can calculate the current time (date) based on the time counted by the RTC 40. The power circuit 41 controls power supplied from the power supply (typically, a battery accommodated in the lower housing 11) provided in the game apparatus 1, and supplies power to various parts of the game apparatus 1.

The game apparatus 1 is also provided with the microphone 43 and an amplifier 44. The microphone 43 and the amplifier 44 are each connected to the I/F circuit 42. The microphone 43 senses the voice of the user speaking to the game apparatus 1, and outputs an audio signal representing the voice to the I/F circuit 42. The amplifier 44 amplifies the audio signal from the I/F circuit 42 to provide an output from the speaker (not shown). The I/F circuit 42 is connected to the CPU 31.

Also, the touch panel 13 is connected to the I/F circuit 42. The I/F circuit 42 includes an audio control circuit for controlling the microphone 43 and the amplifier 44 (speaker), and a touch panel control circuit for controlling the touch panel 13. The audio control circuit performs A/D conversion and D/A conversion on the audio signal, and also converts the audio signal into audio data of a predetermined format. The touch panel control circuit generates touch position data of a predetermined format based on a signal from the touch panel 13, and outputs the generated data to the CPU 31. For example, the touch position data is data representing coordinates of a position (touch position) at which an input was made to the input screen of the touch panel 13. Note that the touch panel control circuit performs reading of a signal from the touch panel 13 and generation of touch position data once every predetermined period of time. The CPU 31 can obtain the position at which an input was made to the touch panel 13 by acquiring the touch position data via the I/F circuit 42.

The above-described operation buttons 14A to 14K constitute an operation button section 14 connected to the CPU 31. The operation button section 14 outputs to the CPU 31 operation data representing the status of input to the operation buttons 14A to 14K (whether or not the buttons have been pressed). The CPU 31 acquires the operation data from the operation button section 14, and executes a process in accordance with an input to the operation button section 14.

The internal camera 23 and the external camera 25 are each connected to the CPU 31. The internal camera 23 and the external camera 25 each take an image in accordance with an instruction from the CPU 31, and output data for the taken image to the CPU 31. In the present embodiment, the CPU 31 instructs either the internal camera 23 or the external camera 25 to perform imaging, and the camera instructed to perform imaging takes an image and transmits image data to the CPU 31.

The first GPU 45 is connected to the first VRAM 47, and the second GPU 46 is connected to the second VRAM 48. In accordance with an instruction from the CPU 31, the first GPU 45 generates a first display image based on display image generation data stored in the main memory 32, and creates an image on the first VRAM 47. In accordance with an instruction from the CPU 31, the second GPU 46 generates a second display image, and creates an image on the second VRAM 48, as in the case of the first GPU 45. The first VRAM 47 and the second VRAM 48 are connected to the LCD controller 49.

The LCD controller 49 includes a register 491. The register 491 stores the value of 0 or 1 in accordance with an instruction from the CPU 31. When the value in the register 491 is 0, the LCD controller 49 outputs the first display image created on the first VRAM 47 to the lower LCD 12, and also outputs the second display image created on the second VRAM 48 to the upper LCD 22. Alternatively, when the value in the register 491 is 1, the LCD controller 49 outputs the first display image created on the first VRAM 47 to the upper LCD 22, and also outputs the second display image created on the second VRAM 48 to the lower LCD 12. For example, the CPU 31 is capable of causing the lower LCD 12 to display an image acquired from either the internal camera 23 or the external camera 25, while causing the upper LCD 22 to display an operation instruction screen generated by a predetermined process.

[Outline of the Game Process]

Next, the game process to be executed by the game program according to the present embodiment will be outlined with reference to FIGS. 3 to 15. This game process implements a game in which two objects appearing in a virtual game space are controlled by the touch panel 13.

Figure 3:
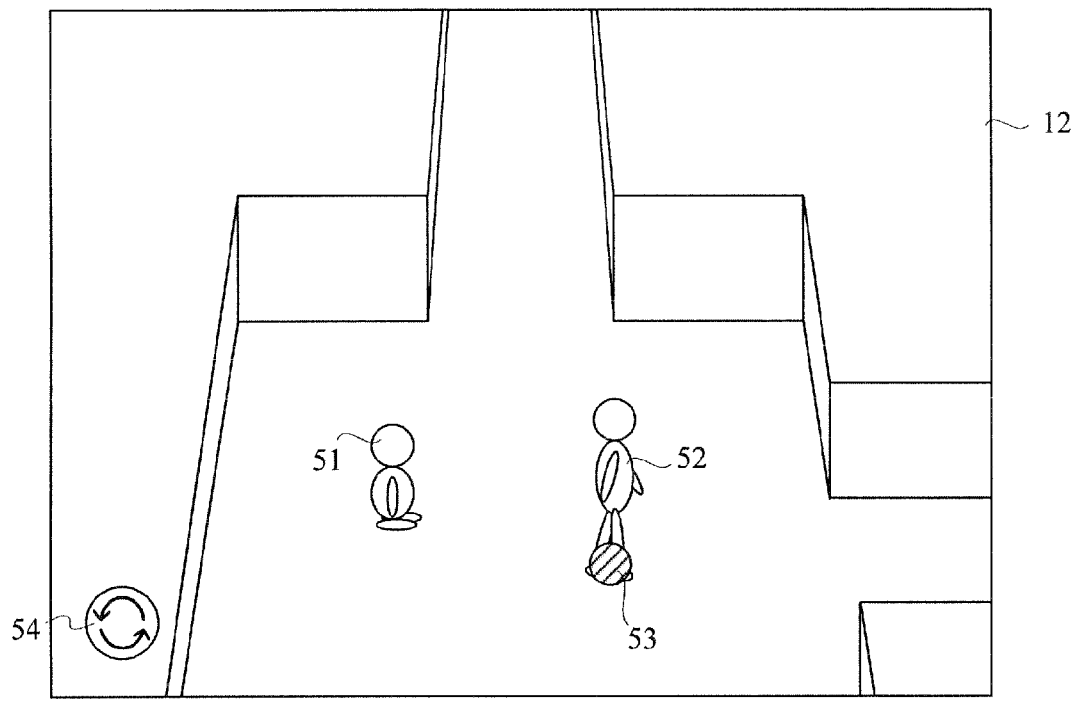
FIG. 3 is a diagram illustrating a game image displayed on a display device by a game process according to the present embodiment.

FIG. 3 is a diagram illustrating a game image displayed on a display device (the lower LCD 12) by the game process of the present embodiment. As shown in FIG. 3, the lower LCD 12 displays a game space image representing a partial area of the virtual game space. Specifically, a game space image is displayed, which includes a first object 51, a second object 52, and a path mark 53. In the present embodiment, the game apparatus 1 can display a game space image representing a partial area of the virtual game space, and a map image representing a greater area than the area represented by the game space image. The game image shown in FIG. 3 corresponds to the game space image, and the game image shown in FIG. 10 to be referred to later corresponds to the map image. In the present embodiment, a switch icon 54 is displayed, superimposed on the game space image. The function of the switch icon 54 will be described later. Note that depending on the circumstances, the lower LCD 12 may display, in addition to the game space image described above, a path inputted by using the touch panel 13, a follow icon (to be described later), etc.

As shown in FIG. 3, two objects, i.e., the first object 51 and the second object 52, appear in the virtual game space. The first and second objects 51 and 52 are each an object to be controlled by the player. In the present embodiment, the player operates the objects 51 and 52 using the touch panel 13. The action of the first object 51 is controlled based on a position (touch position) on the input screen of the touch panel 13 that is touched by the player or a path inputted by the player on the input screen. The action of the second object 52 is controlled so that the second object 52 moves along the path.

Figure 4:
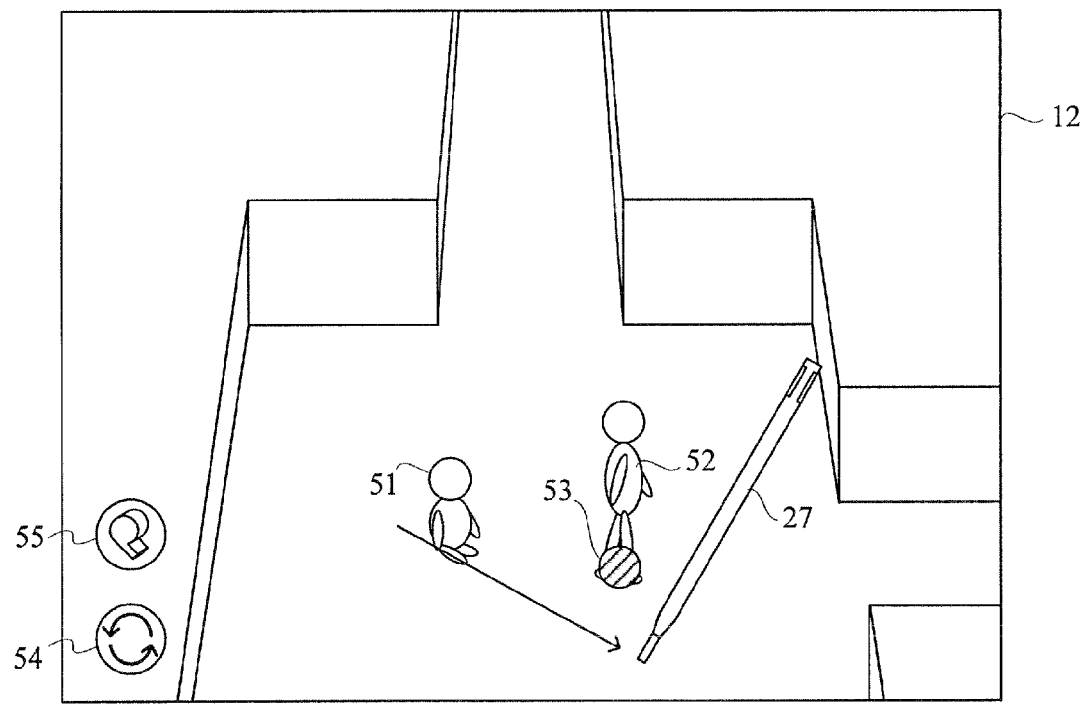
FIG. 4 is a diagram illustrating a game image showing how a first object 51 acts in response to the player's operation.
Figure 5:
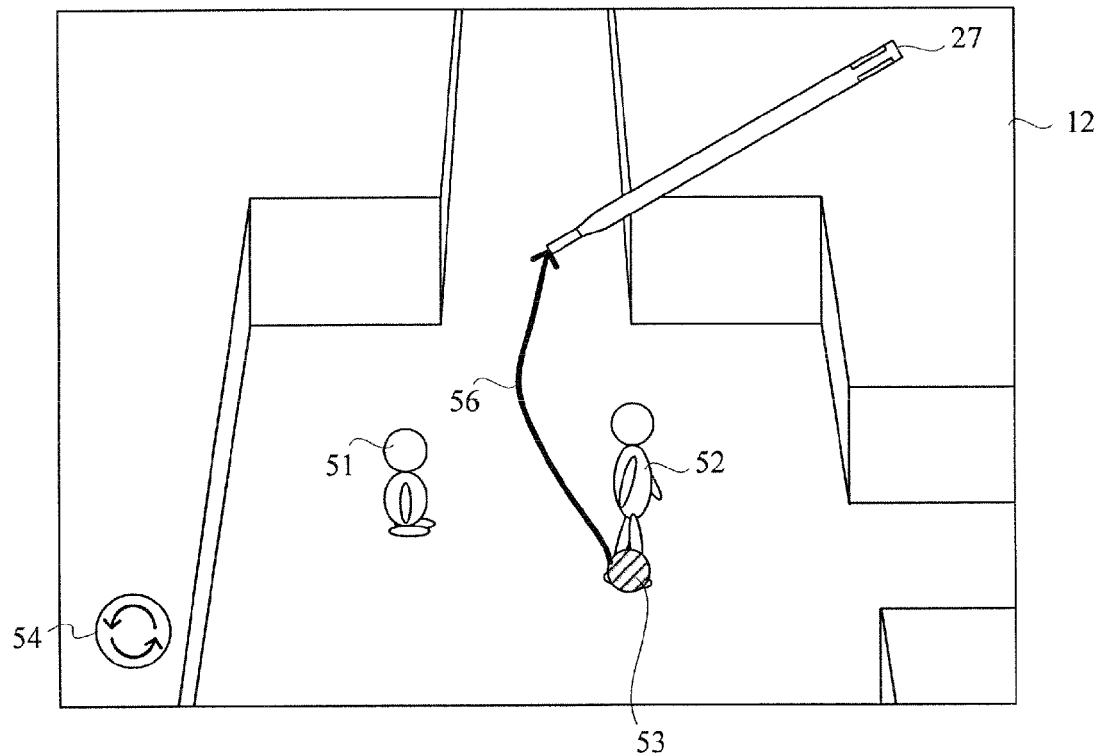
FIG. 5 is a diagram illustrating a game image where a path 56 for controlling a second object 52 is being inputted by the player.

FIG. 4 is a diagram illustrating a game image showing how the first object 51 acts in response to the player's operation. In the present embodiment, an operation on the first object 51 is performed by using the touch panel 13. An operation on the first object 51 is performed on the game space image (not on the map image). As shown in FIG. 4, the path mark 53 is displayed at the position of the second object 52 in the game space image. In order to control the first object 51, the player makes an input starting from a position within the game space that is outside the path mark 53. For example, as shown in FIG. 4, if the player makes an input by touching a position within the game space, the game apparatus 1 moves the first object 51 toward a position (within the game space) corresponding to the touch position. Note that the operation of the first object 51 using the touch panel 13 is not limited to the operation shown in FIG. 4, but may be any suitable operation. For example, the game apparatus 1 may control the first object 51 to perform an action such as attacking or jumping, depending on the path inputted on the touch panel 13. Note that while the first object 51 is being controlled, the game apparatus 1 displays a follow icon 55, superimposed on the game space image, on the lower LCD 12, as shown in FIG. 5. The function of the follow icon 55 will be described later.

FIG. 5 is a diagram illustrating a game image where the path 56 for controlling the second object 52 is being inputted by the player. Also when controlling the second object 52, as when controlling the first object 51, the player makes an input on the game space image by using the touch panel 13. When controlling the second object 52, however, the player inputs the path 56 starting from a position of the path mark 53, as shown in FIG. 5. The inputted path 56 is displayed, superimposed on the game space image, on the lower LCD 12. In the present embodiment, the game apparatus 1 displays the path 56 with an arrowhead attached at its end, as shown in FIG. 5, while the path 56 is being inputted.

Figure 6:
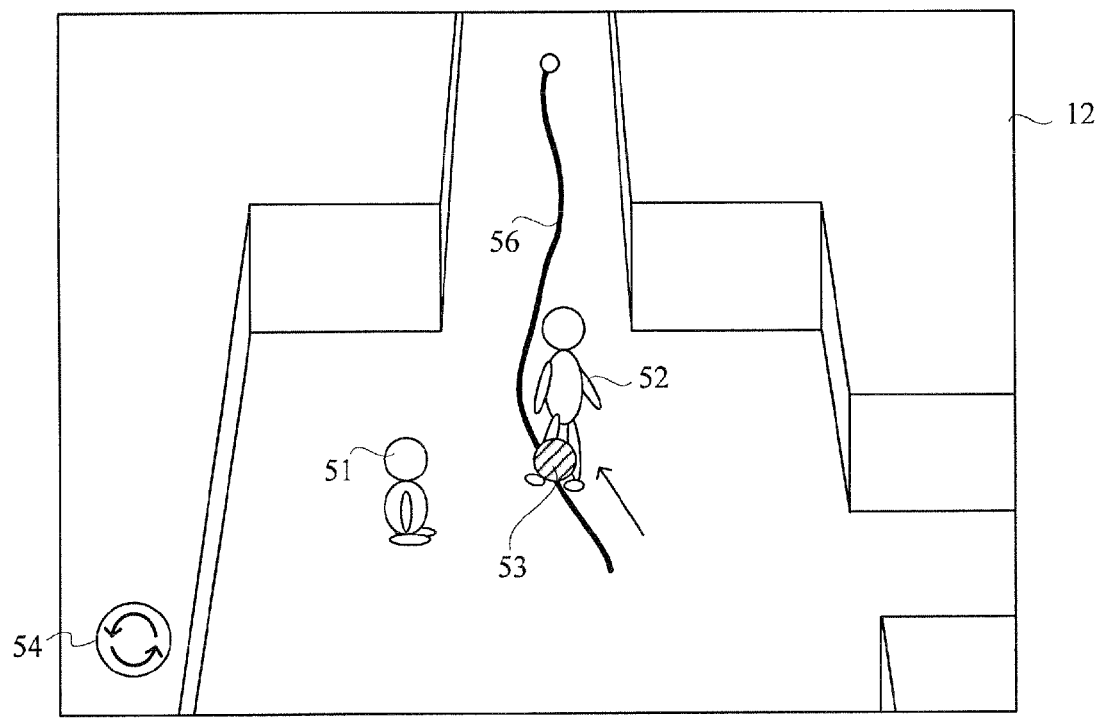
FIG. 6 is a diagram illustrating a game image showing how the second object 52 moves along the inputted path 56.

FIG. 6 is a diagram illustrating a game image showing how the second object 52 moves along the inputted path 56. As shown in FIG. 6, when the input of the path 56 is finished, the game apparatus 1 moves the second object 52 along the path 56. As described above, in the present embodiment, the path 56 is inputted on the game space image (not on the map image), and how the second object 52 moves along the inputted path 56 is shown on the game space image. Note that in the present embodiment, the game apparatus 1 displays a path 56 that has been inputted with a circle attached at its end, instead of an arrowhead, so that the player can easily distinguish between a path being inputted and a path that has been inputted.

Figure 7:
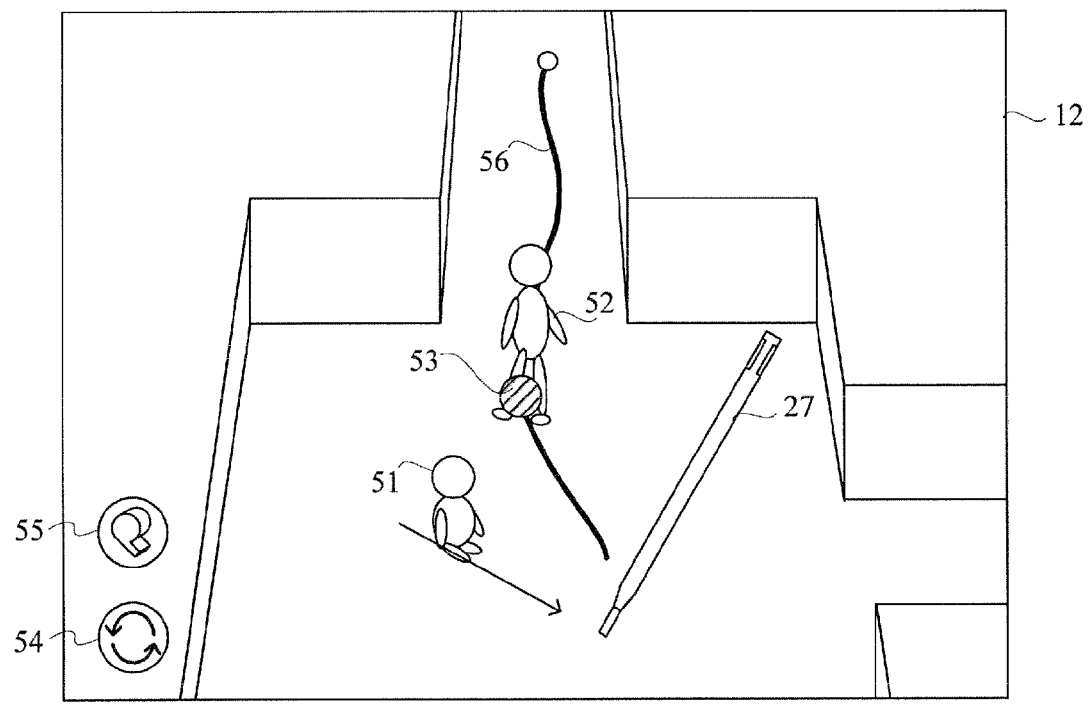
FIG. 7 is a diagram illustrating a game image where the first object 51 is controlled while the second object 52 is moving.

Note that in the present embodiment, the player is allowed to control the first object 51 even while the second object 52 is moving along the path 56. FIG. 7 is a diagram illustrating a game image where the first object 51 is controlled while the second object 52 is moving. As shown in FIG. 7, if the player makes an input by touching a position within the game space that is outside the path mark 53 while the second object 52 is moving along the path 56, the game apparatus 1 moves the first object 51 toward a position corresponding to the touch position. As described above, in the present embodiment, the second object 52 continues to move even while controlling the first object 51. That is, while the second object 52 is moving, the player can move both of the first object 51 and the second object 52. In the present embodiment, since the path 56 is displayed even while the second object 52 is moving (FIG. 7), the player can control the first object 51 while estimating the course of movement of the second object 52.

As described above, in the present embodiment, the game apparatus 1 accepts inputs for controlling the objects 51 and 52 on the game space image representing a partial area of the virtual game space, not on the map image. That is, the game apparatus 1 controls the action of the first object 51 within the game space image based on the player's operation (FIG. 4, FIG. 7). The game apparatus 1 detects a path inputted on the game space image using the touch panel 13, and moves the second object 52 in the game space image along the path (FIG. 5, FIG. 6). In this way, the player can control two objects on the same image, with no need for a screen-switching operation. Therefore, the player can easily perform the operation of moving the second object 52 using a path, and it is possible to provide a game with a good controllability.

In the present embodiment, the game apparatus 1 controls the action of the first object 51 based on the input made on the game space image using the touch panel 13. That is, the player can control both of the first object 51 and the second object 52 using the touch panel 13. For example, where the first object 51 is controlled by operation buttons, the player needs to take the trouble of repositioning the touch pen in hand when switching the controlled object between the first object 51 and the second object 52. In contrast, in the present embodiment, two objects can be controlled with a single input device, and it is therefore possible to easily control two objects.

Where both of the first object 51 and the second object 52 are controlled using the touch panel 13, it is necessary to determine the object meant to be controlled by the touch input being made. In view of this, the game apparatus 1 moves the second object 52 along a path represented by an input made on the game space image if the starting position of the input is located within a predetermined designated area (the area within the path mark 53) (FIG. 5, FIG. 6), whereas the game apparatus 1 controls the action of the first object 51 based on the input if the starting position of the input is located outside the designated area (FIG. 4). That is, the game apparatus 1 determines whether to control the second object 52 or the first object 51 based on an input made on the touch panel 13 depending on whether the starting position of the input is inside or outside the designated area. Therefore, according to the present embodiment, the player does not need to perform an operation only for switching controlled objects from one to another, thus making it easier to control two objects. If both of the two objects act in response to a single touch input, the player needs to operate while simultaneously taking two objects into consideration, thus making the operation more difficult. In contrast, according to the present embodiment, both of the two objects will not react to a single touch input (except for the case to be described later where the second object 52 follows the first object 51), and the player can therefore easily control two objects.

Moreover, in the present embodiment, the game apparatus 1 displays the path mark 53, as an image representing the designated area, superimposed on the second object 52. If the designated area were not displayed, the player would not know the boundary indicating which object is to be controlled, and the player might perform an erroneous operation. For example, there may occur a case where the player makes a touch input at a position near the second object 52 (intending to control the second object 52) but the touch position is actually outside the designated area, and the game apparatus 1 consequently makes the first object 51 to act. In contrast, in the present embodiment, the boundary can be displayed clearly by superimposing the path mark 53 on the second object 52. Therefore, even if two objects are controlled on the same image, it is possible to prevent an erroneous operation of controlling an object that is not intended by the player.

Figure 8:
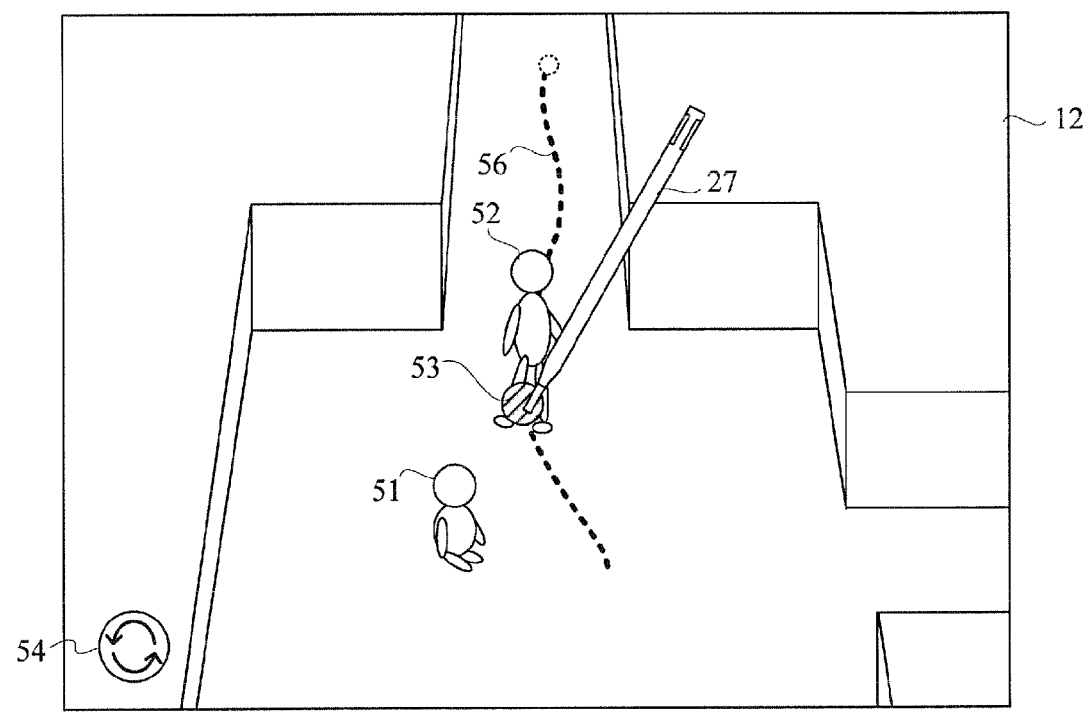
FIG. 8 is a diagram illustrating a game image where an operation of changing a path is performed midway through the movement of the second object 52.
Figure 9:
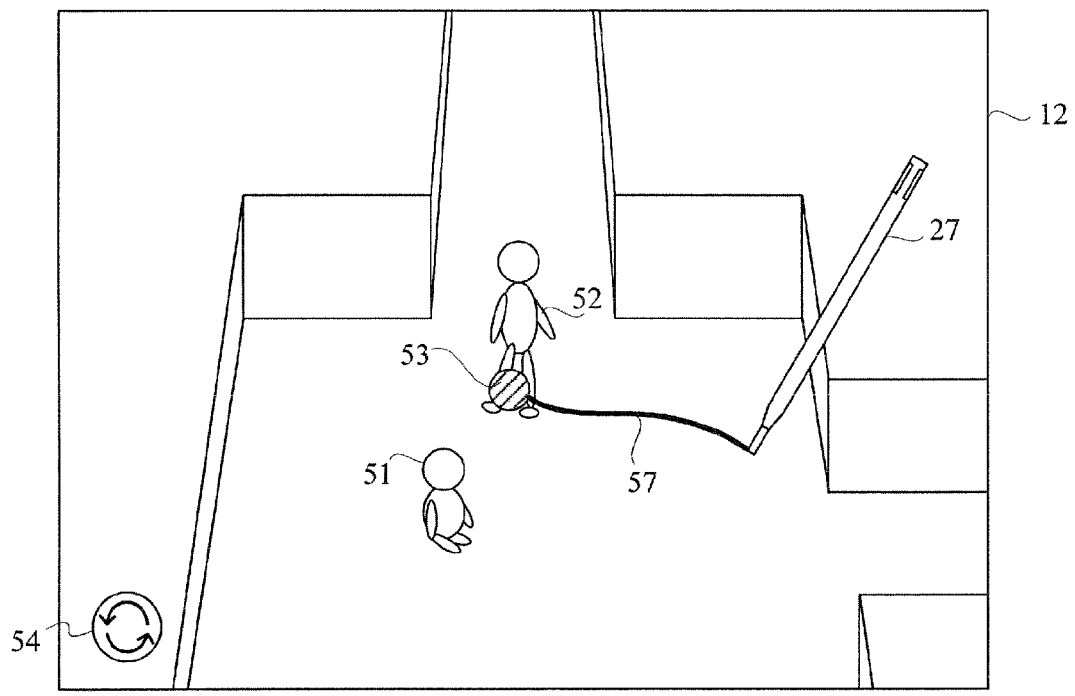
FIG. 9 is a diagram illustrating a game image where an operation of changing a path is performed midway through the movement of the second object 52.

In the present embodiment, the player can change a path while the second object 52 is moving along the path. FIGS. 8 and 9 are diagrams each illustrating a game image where an operation of changing a path is performed midway through the movement of the second object 52. As shown also in FIGS. 6 and 7, when the second object 52 moves along the path 56, the game apparatus 1 moves the path mark 53, together with the second object 52, along the path 56. When changing the path at this point, the player makes a new input starting from the position of the path mark 53, as shown in FIG. 8. As the new input is made, the game apparatus 1 erases the path 56, which has been displayed before the input is made (in FIG. 8, the path 56 to be erased is indicated by a dotted line). Moreover, the second object 52 stops. Then, the player inputs a new path 57 starting from the position of the path mark 53, as shown in FIG. 9. When the input of the path 57 is finished, the game apparatus 1 moves the second object 52 along the new path 57. As described above, if a new input is made starting from a position within the path mark 53 while the second object 52 is moving along the path 56, the game apparatus 1 moves the second object 52 along the path 57 represented by the new input. Thus, the player can easily change the path for moving the second object 52 therealong. In the present embodiment, since the path mark 53 is displayed, which moves together with the second object 52, the player can make an input aiming at the path mark 53, and it is possible to prevent such an erroneous operation as described above even when changing the path.

In the present embodiment, the player can not only move the second object 52 along a path, but also move the second object 52 so as to follow the first object 51. Specifically, in order to move the second object 52 so as to follow the first object 51, the player makes an input on the follow icon 55 described above (FIG. 4 or 7) using the touch panel 13 (touches the position of the follow icon 55). When an input is made on the follow icon 55, the game apparatus 1 controls the movement of the second object 52 based on the position of the first object 51. Specifically, it controls the movement of the second object 52 so as to follow the first object 51. Therefore, in the present embodiment, even when the second object 52 has moved away from the first object 51, it is possible to easily move the second object 52 near the first object 51. Note that in the present embodiment, the game apparatus 1 erases the follow icon 55 at least while an input whose starting position is within the path mark 53 is being made on the game space image. That is, the follow icon 55 is not displayed while the first object 51 is being controlled (FIG. 4, FIG. 7), and the follow icon 55 is displayed while the second object 52 is being controlled (FIG. 5, FIG. 6). As described above, in the present embodiment, the follow icon 55 is not displayed when it is not needed, and it is therefore possible to prevent an erroneous operation by the player and to provide a game image that is easier for the player to view.

In the present embodiment, the player can switch an object to be the controlled object between the objects 51 and 52. Specifically, in order to switch objects from one to another, the player makes an input on the switch icon 54 (FIG. 3, etc.) using the touch panel 13 (touches the position of the switch icon 54). When an input is made on the switch icon 54, the game apparatus 1 switches between a state where a display area is set so that the first object 51 is included in the game space image displayed on the lower LCD 12 and another state where a display area is set so that the second object 52 is included in the game space image. In the present embodiment, one of the first and second objects 51 and 52 may move out of the display area of the lower LCD 12 so that both of the objects cannot be displayed on the lower LCD 12 at the same time. Even in such a case, the player can easily keep, displayed on the lower LCD 12, one of the objects 51 and 52 that the player wishes to be displayed (one that the player wishes to control).

Figure 10:
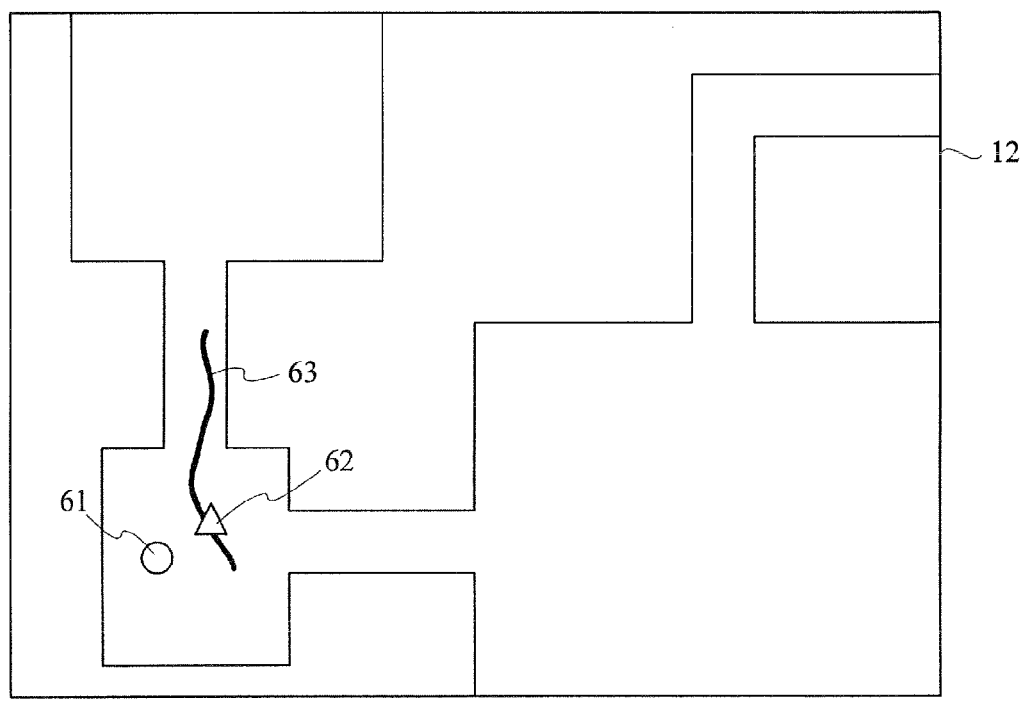
FIG. 10 is a diagram illustrating a game image displayed on an upper LCD 22 of a game apparatus 1.

In the present embodiment, the game apparatus 1 displays a map image representing a greater area than the area represented by the game space image on the upper LCD 22. FIG. 10 is a diagram illustrating a game image displayed on the upper LCD 22 of the game apparatus 1. As shown in FIG. 10, the upper LCD 22 displays a mark 61 representing the first object 51 and a mark 62 representing the second object 52, superimposed on the map image. Moreover, when there is an inputted path for moving the second object 52 therealong, the path 63 is displayed, superimposed on the map image. Thus, the player can visually check inputted paths also on the map image.

Figure 11:
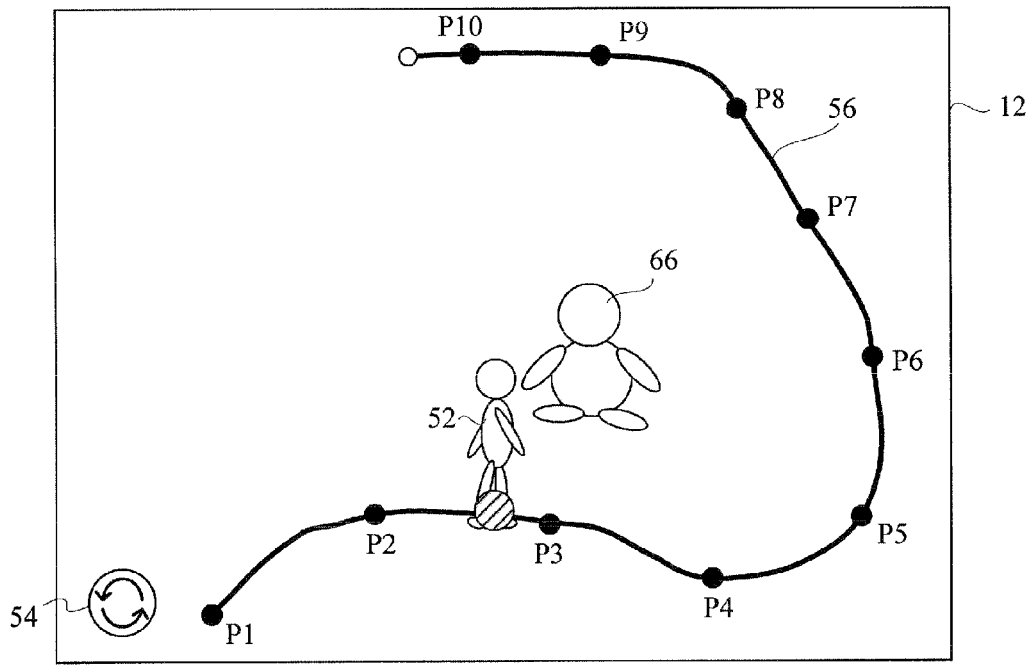
FIG. 11 is a diagram illustrating a game image while the second object 52 is moving along the path 56.

In the present embodiment, the game apparatus 1 sometimes controls the second object 52, moving along a path, to perform a predetermined action. An action performed by the second object 52 midway through the movement along a path is herein referred to as a "mid-path action". FIG. 11 is a diagram illustrating a game image while the second object 52 is moving along the path 56. Note that although FIG. 11 shows a game image where the first object 51 is absent for an easier understanding of the figure, the first object 51 may be included in the game image (this similarly applies also to FIGS. 12 to 15).

In FIG. 11, an enemy object 66 is present near the second object 52 moving along the path 56. If the second object 52 comes near the enemy object 66 while moving along the path 56, the second object 52 performs a mid-path action of attacking the enemy object 66. Hereinafter, an object that is a target of a mid-path action is referred to as a "target object". A target object may be the enemy object 66 as shown in FIG. 11, or may be an item object or an unmovable object placed in the game space such as a rock. A mid-path action of the second object 52 against a target object is not controlled by the player's operation, but is controlled automatically by the game apparatus 1.

Figure 12:
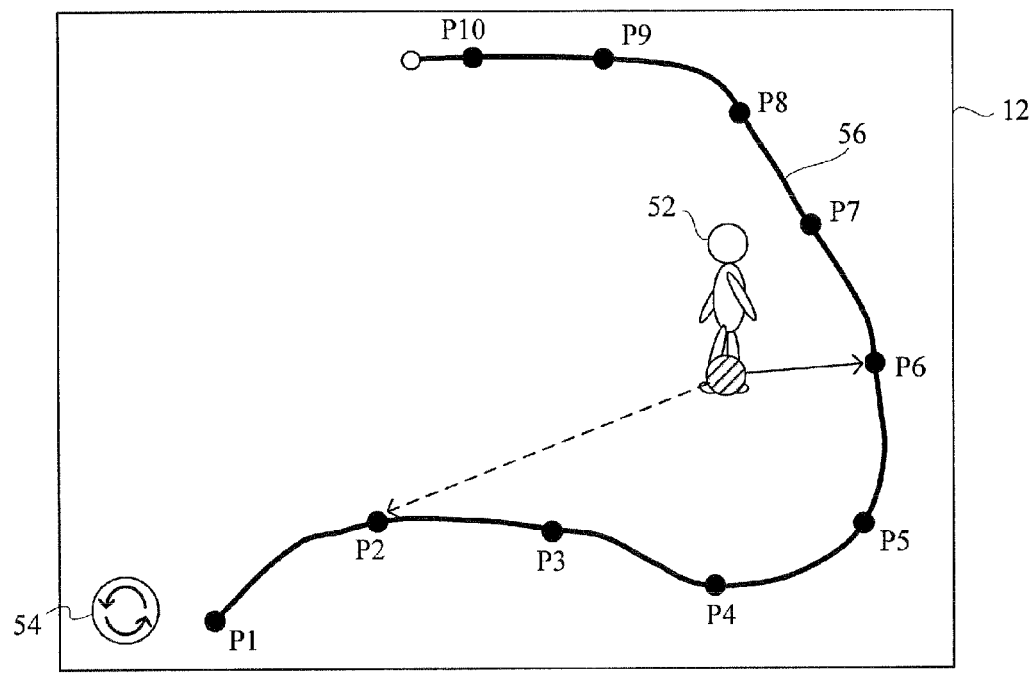
FIG. 12 is a diagram illustrating a game image at a point in time when the second object 52 finishes a mid-path action.

FIG. 12 is a diagram illustrating a game image at a point in time when the second object 52 finishes a mid-path action. In FIG. 12, the second object 52 is present at a position away from the path 56 at the finish of the mid-path action against the enemy object 66 (i.e., when the enemy object 66 is defeated). Since a mid-path action is not performed based on the path 56, the position of the second object 52 may be away from the path 56, as shown in FIG. 12, at the finish of the mid-path action. In this case, the game apparatus 1 returns (moves) the second object 52 to a position along the path 56, and resumes the movement along the path 56.

Specifically, when the mid-path action is finished, the game apparatus 1 determines the return position, which is the position at which the object, having finished the action, returns to the path 56. Note that in the present embodiment, the return position is determined based on the position of the object having finished the mid-path action and the position of the path 56 in the game space, details of which will follow later. Then, the game apparatus 1 resumes the movement along the path 56 after returning (moving) the second object 52, having finished the mid-path action, to the return position. Thus, the movement of the second object 52 along the path 56 is carried out up to the end point of the path 56 even if the second object 52 performs a mid-path action.

As described above, according to the present embodiment, the second object 52 resumes moving along the path 56 even if the second object 52 performs a mid-path action away from the path 56. Therefore, even if a mid-path action is performed, the player does not need to again input a path, and the second object 52 can be moved up to the end of the path, which has been inputted before the mid-path action. Therefore, according to the present embodiment, the player is allowed to input a path for moving an object therealong in a simpler operation than that in the prior art where the player needs to input a path anew each time a mid-path action is performed.

Next, the process of determining the return position will be described. Note that in the present embodiment, the game apparatus 1 uses, in the process of determining the return position, a plurality of registered points selected along the path 56 for the purpose of making this process easier and faster. That is, the game apparatus 1 stores, as registered points, one or more points along the path 56 that have been inputted at a predetermined time interval. Points P1 to P10 shown in FIGS. 11 to 15 are registered points. The return position is selected from among these registered points.

When a mid-path action described above is performed, the game apparatus 1 stores, as the "original point", the position (a registered point) of the second object 52 at the start of the mid-path action. Stored as the original point is one of the registered points already passed over by the second object 52 that is closest to the position of the second object 52 at the start of the mid-path action. In the example shown in FIG. 11, since the position of the second object 52 at the start of the mid-path action is between the registered points P2 and P3, the registered point P2 is stored as the original point.

When the mid-path action is finished, the game apparatus 1 selects, as a "nearest point", a registered point that can be reached within the shortest amount of time from the position of the second object 52 at the finish of the mid-path action. In FIG. 12, the registered point P6, which is closest to the position of the second object 52 at the finish of the mid-path action is selected as the "nearest point".

Once the nearest point is selected, the game apparatus 1 determines whether or not the nearest point is a position equal or subsequent to the original point along the path. In the present specification, the relative position of a point along a path is represented based on the time at which the second object 52 passes through the point along the path. That is, "position B being equal or subsequent to position A" means that "the second object 52 passes through position B after passing through position A". Similarly, "the nearest point being at a position prior to the original point" means that "the second object 52 has already passed through the nearest point".

If the nearest point is at a position equal or subsequent to the original point, the game apparatus 1 determines the position of the nearest point to be the return position (return point). Therefore, the second object 52, having finished the mid-path action, moves to the nearest point and then resumes moving along the path 56. For example, in the case of FIG. 12, since the nearest point P6 is positioned subsequent to the original point P2, the second object 52 moves to the nearest point P6, and resumes moving along the path 56 starting from the nearest point P6.

As described above, in the present embodiment, the game apparatus 1 determines the return position based on a "reaching time" (or "reaching distance") that is needed to reach the position from the position of the second object 52 having finished the mid-path action. Specifically, in the case of FIG. 12, a registered point that can be reached within the shortest amount of time from the position of the second object 52 having finished the mid-path action is selected as the return point. If the position of the original point were selected as the return point in the game state shown in FIG. 12, the second object 52, which has already advanced near the registered point P6, would return to the position of the original point P2 away from the current position (the position at the finish of the mid-path action) and then advance from the original point P2 to the position of the registered point P6. In such a case, the second object 52 moves insufficiently, and the movement requires a long time, thus frustrating the player. In contrast, according to the present embodiment, the second object 52 can be quickly returned to the path 56, and the second object 52 can be moved efficiently.

Figure 13:
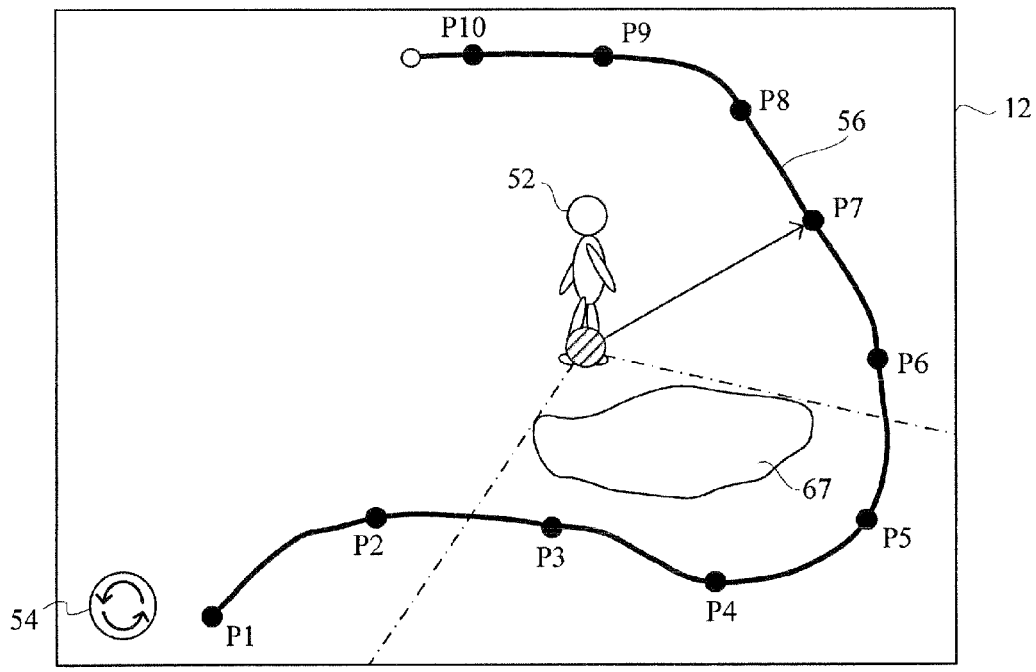
FIG. 13 is a diagram illustrating another example of a game image at a point in time when the second object 52 finishes a mid-path action.

Note that in the present embodiment, the nearest point is a registered point that can be reached within the shortest amount of time from the position of the second object 52 at the finish of the mid-path action. Therefore, if an obstacle, or the like, is present between the position at the finish of the mid-path action and a registered point that is closest to that position, the registered point may not be the nearest point. FIG. 13 is a diagram illustrating another example of a game image at a point in time when the second object 52 finishes a mid-path action. In FIG. 13, there is a pond 67 (it is assumed herein that the second object 52 cannot pass through a pond) between the position of the second object 52 at the finish of the mid-path action and the registered point P3, which is closest to that position. Then, the game apparatus 1 selects the nearest point from among the registered points P1 to P10 while excluding the registered points P3 to P5, which cannot be reached without detouring around the pond 67. As a result, in the case of FIG. 13, the registered point P7 is selected as the nearest point. As described above, by selecting the nearest point based on the reaching time that is needed to reach the position from the position at the finish of the mid-path action, it is possible to more accurately select a registered point that can be reached by the second object 52 within the shortest amount of time.

Figure 14:
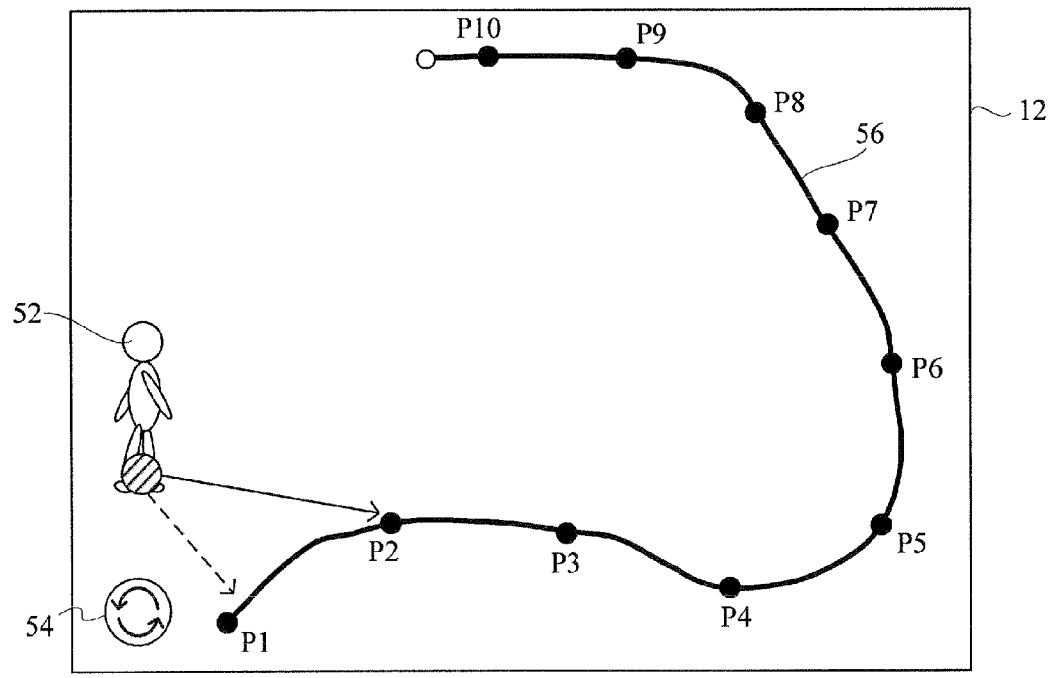
FIG. 14 is a diagram illustrating another example of a game image at a point in time when the second object 52 finishes a mid-path action.

Note that in the present embodiment, the game apparatus 1 does not always select the position of the nearest point as the return point, but may alternatively select the position of the original point as the return point depending on the circumstances. That is, if the nearest point is a position prior to the original point (if the nearest point is not a position equal or subsequent to the original point), the game apparatus 1 determines the original point to be the return point. FIG. 14 is a diagram illustrating another example of a game image at a point in time when the second object 52 finishes a mid-path action. In FIG. 14, assume that the nearest point is the registered point P1, and the original point is the registered point P2. Then, the registered point P2 is determined to be the return point, and the second object 52, having finished a mid-path action, moves to the registered point P2 and then resumes moving along the path 56.

As described above, in the present embodiment, the game apparatus 1 determines the return position (return point) so that the return position is a position equal or subsequent to the original point (with respect to the direction in which the second object 52 advances). If the registered point P1, being the nearest point, were determined to be the return point in the game state shown in FIG. 14, the second object 52 would again pass through the registered points P1 to P2. Therefore, due to the inefficient movement, in which the second object 52 passes through the same path twice, the player may be frustrated. In contrast, in the present embodiment, the second object 52 will not pass through path portions that it has once passed through, and it is therefore possible to efficiently move the second object 52.

Note that in other embodiments, the game apparatus 1 may always determine the nearest point to be the return position, or may always determine the original point to be the return position. For example, in a case where it is necessary to quickly return the second object 52 onto the path due to the game settings (e.g., a case where a character can attack an enemy character only when located on the path), it is advantageous to always determine the nearest point to be the return position. In a case where it is desirable that the second object 52 is moved faithfully along the path inputted by the player, it is advantageous to always determine the original point to be the return position.

In the present embodiment, some of the target objects trigger predetermined event actions as mid-path actions. Herein, a target object that triggers a predetermined event action is referred to as an "event object", and the position of an event object is referred to as the "event position". The game apparatus 1 controls the second object 52 to perform an event action as a mid-path action when the event position set in the game space and the position of the second object 52 come into a predetermined positional relationship. Note that not all of the target objects described above are set to be event objects, but only predetermined target objects are set as event objects. For example, enemy objects and normal item objects may not be set as event objects, while item objects and gimmick objects that are important to the progress of the game are set as event objects. For example, an object of an item that must be obtained in order to progress in the game and an object of a switch for opening a door that must be opened to advance any further are set as event objects.

In the present embodiment, the game apparatus 1 determines a return position along the path so that the return position is equal or prior to a position at which the second object 52 performs the event action. The details of this will now be described.

The game apparatus 1 sets, as a "priority point", any one of positions (registered points) along the path at which the second object 52 performs the event action. Specifically, a priority point is a registered point with an event object present in the vicinity thereof, and in other words, is a registered point that triggers an event action when it is passed over by the second object 52.

Figure 15:
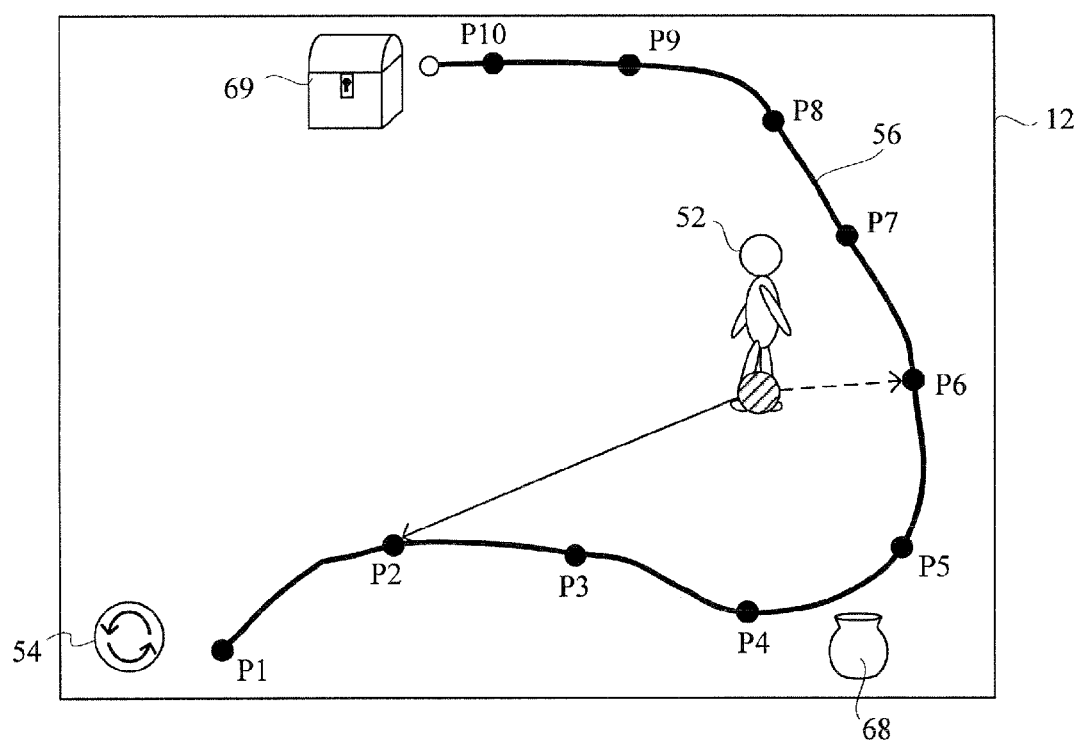
FIG. 15 is a diagram illustrating a game image where priority points are set.

FIG. 15 is a diagram illustrating a game image where priority points are set. In FIG. 15, a pot object 68 and a treasure chest object 69, which are event objects, are placed in the game space. When the second object 52 comes near the pot object 68, the second object 52 performs, as a mid-path action, an action of picking up a key out of the pot, and when the second object 52 comes near the treasure chest object 69, the second object 52 performs, as a mid-path action, an action of opening the treasure chest using the key. In FIG. 15, the player has inputted the path 56, which passes near the pot object 68 and then passes near the treasure chest object 69. Then, the game apparatus 1 sets, as priority points, the registered point P4 within a predetermined distance from the pot object 68 and the registered point P10 within a predetermined distance from the treasure chest object 69.

Assume that the game state shown in FIG. 15 is where the second object 52 has finished a mid-path action with the registered point P2 being the original point. Then, as described above, the game apparatus 1 determines the registered point P6 to be the nearest point, and if the nearest point is a position prior to the original point, the game apparatus 1 determines the original point to be the return point.

If the nearest point P6 is determined to be the return point, the second object 52 will skip a priority point, and the second object 52 will not perform the action of picking up a key out of a pot. However, if the path 56 has been inputted as shown in FIG. 15, it can be presumed that the player has inputted the path 56 intending to control the second object 52 to perform an action of first picking up the key out of the pot and then going to, and opening, the treasure chest. Therefore, if the second object 52, having finished a mid-path action, skips the priority point when returning to the path, the action of the second object 52 is against the intention of the player.

In view of this, in the present embodiment, the game apparatus 1 determines a return point so that it is a position equal or prior to any priority point. That is, the game apparatus 1 determines (where the nearest point is not a position prior to the original point) whether or not the nearest point is a position subsequent to any priority point. Then, if the nearest point is a position subsequent to any priority point, the game apparatus 1 does not select the nearest point as the return point, but determines the original point to be the return point. If the nearest point is a position equal or prior to any priority point (if the nearest point is not a position subsequent to any priority point), the game apparatus 1 determines the nearest point to be the return point. Therefore, in the case shown in FIG. 15, since the nearest point P6 is a position subsequent to the priority point P4, the original point P2 is selected as the return point. In this way, the second object 52, having performed a mid-path action, will not return to a registered point that is equal or subsequent to a priority point while skipping the priority point, and it is thus possible to ensure that the second object 52 passes through the priority point. Therefore, it is possible to control the second object 52 to perform an action as intended by the player, and it is possible to provide a game with a good controllability.

Figure 16:
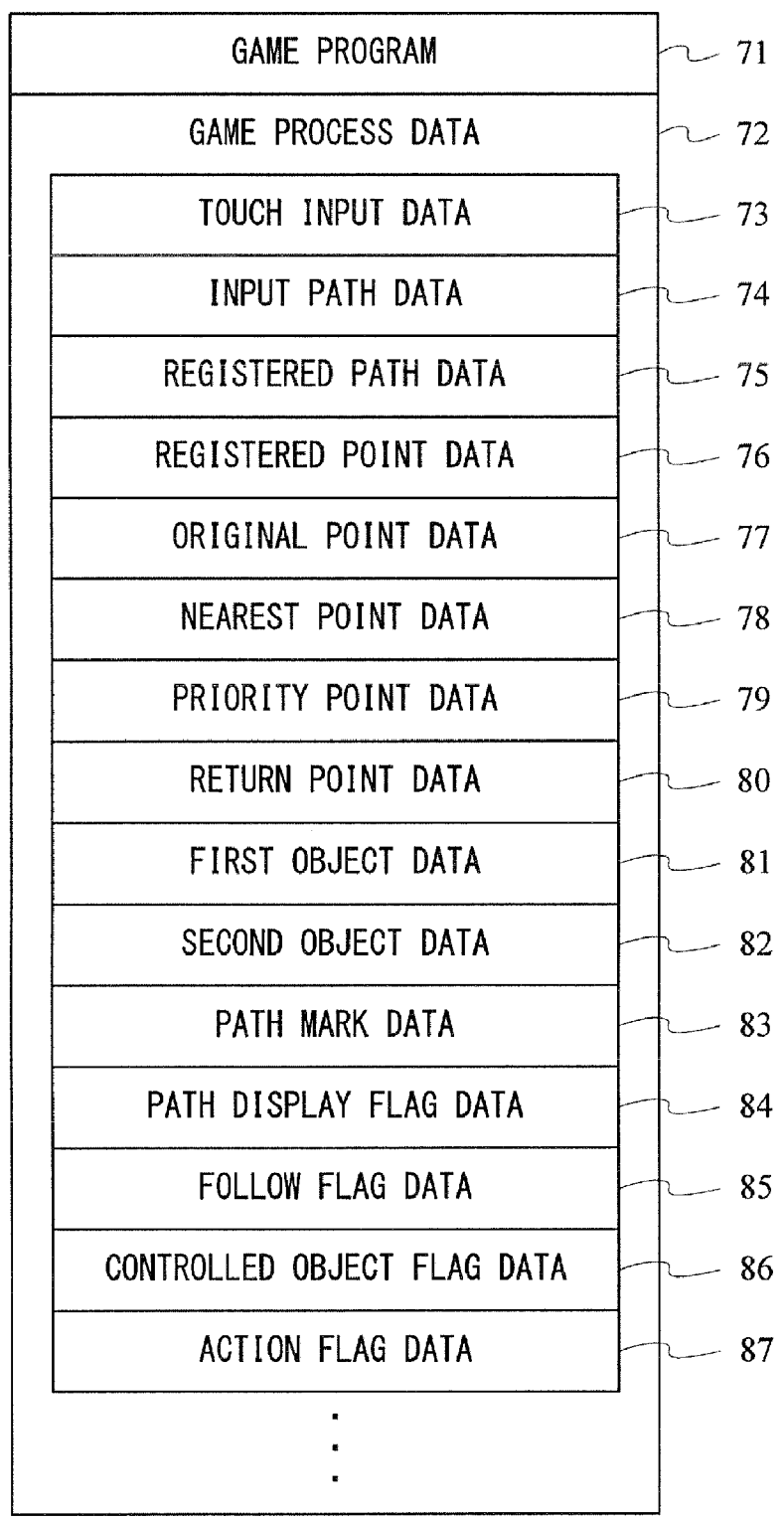
FIG. 16 is a diagram illustrating data stored in a main memory 32 of the game apparatus 1.

[Details of the game process] Hereinafter, the game process to be executed by the game program according to the present embodiment will be described in detail with reference to FIGS. 16 to 23. First, various data to be used in the game process will be described. FIG. 16 is a diagram illustrating data stored in the main memory 32 of the game apparatus 1. In FIG. 16, the main memory 32 has stored therein a game program 71 and game process data 72 according to the present embodiment.

Figure 17:
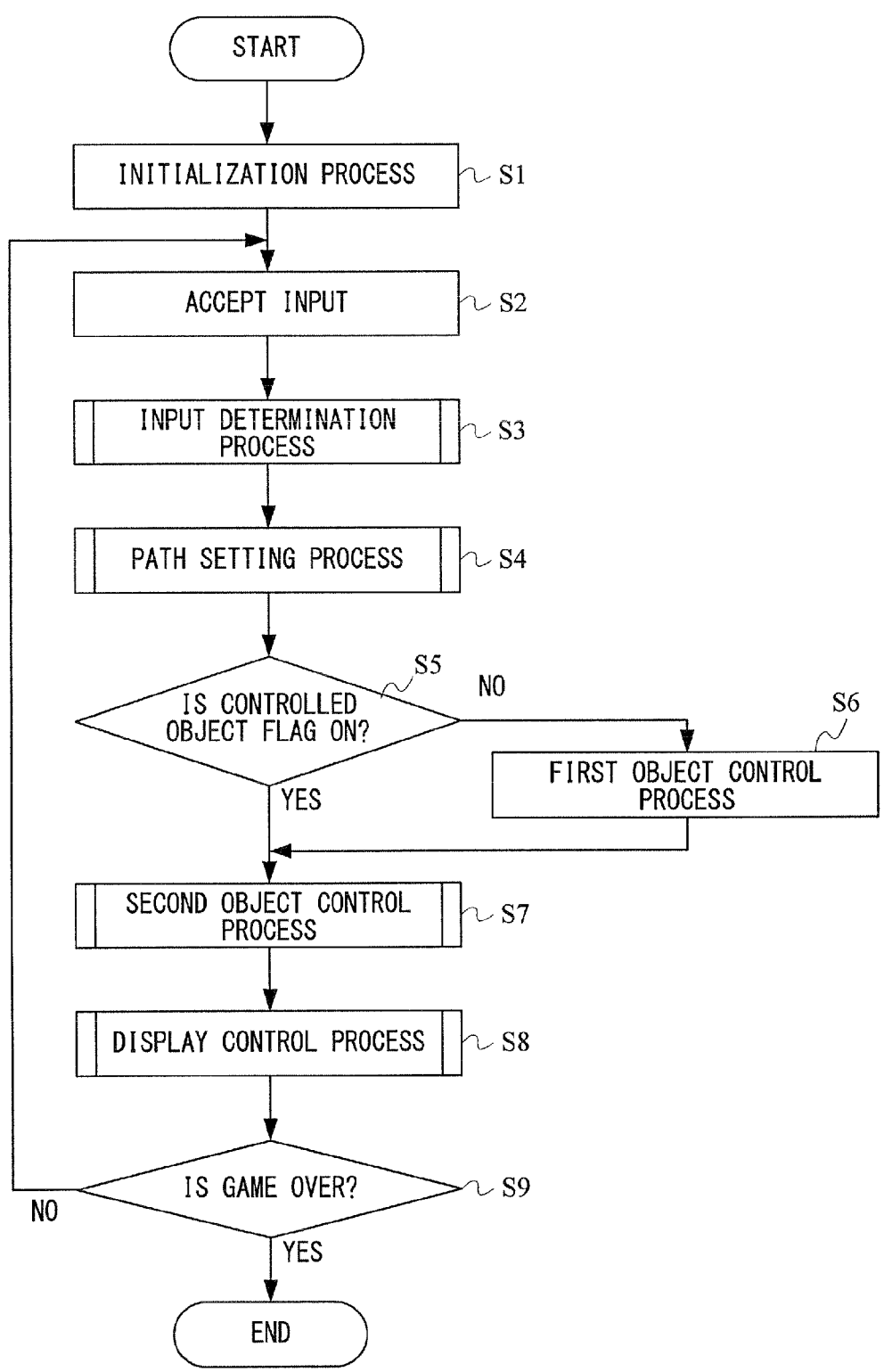
FIG. 17 is a main flow chart illustrating the flow of a game process executed by the game apparatus 1.

The game program 71 is a program for causing the CPU 31 of the game apparatus 1 to execute the game process to be described later (FIG. 17). The game program 71 may be stored to the main memory 32 by being read from the memory card 29 at a suitable time or being acquired via communication with any device external to the game apparatus 1.

The game process data 72 is data to be used in the game process to be described later (FIG. 17). The game process data 72 includes touch input data 73, input path data 74, registered path data 75, registered point data 76, original point data 77, nearest point data 78, priority point data 79, return point data 80, first object data 81, second object data 82, path mark data 83, path display flag data 84, follow flag data 85, controlled object flag data 86, and action flag data 87. Note that the game process data 72 includes data required for the game process, such as image data of various objects and icons appearing in the game and data representing parameters set for various objects, in addition to the data shown in FIG. 16.

The touch input data 73 is data obtained from the touch panel 13 as the touch position data. Specifically, the touch input data 73 represents the coordinates of the position (touch position) at which an input has been made if the player has made an input on the touch panel 13, and indicates that no input has been made if the player has made no input on the touch panel 13.

The input path data 74 is data representing a path that is inputted on the touch panel 13. Specifically, the input path data 74 represents (in the order of input) the coordinates of one or more touch positions that are inputted successively. That is, if the player has made an input by drawing a path on the touch panel 13, the main memory 32 stores, as the touch input data 73, data that represents, in the order of input, the coordinates of the points of the path.

The registered path data 75 is data representing a path that is registered as a path for moving the second object 52 therealong. As described above, in the present embodiment, not all paths inputted by the player are used for moving the second object 52, but only those paths whose starting points are located within the path mark 53 are used for moving the second object 52. That is, data representing a path, among all paths inputted by the player, whose starting point is located within the path mark 53 is stored in the main memory 32 as the registered path data 75.

The registered point data 76 is data representing one or more registered points set along a path inputted by the player. Specifically, registered points are one or more touch positions extracted at an interval of a predetermined number of positions (e.g., one for every 100 positions) from among all the touch positions (arranged in the order of input) represented by the registered path data 75. Therefore, it can be said that registered points are those of all points of a path that are inputted at a predetermined time interval. Note that in other embodiments, the game apparatus 1 may extract, as registered points, those of all points of a path that are inputted at a predetermined distance interval. In the present embodiment, the game apparatus 1 stores, as the registered point data 76, data obtained by numbering the extracted registered points in the order of input.

The original point data 77 is data representing the original point described above. In the present embodiment, since each registered point is numbered, the original point data 77 is data representing the number attached to the original point. The nearest point data 78 is data representing the nearest point described above, the priority point data 79 is data representing the priority point described above, and the return point data 80 is data representing the return point described above. The nearest point data 78, the priority point data 79 and the return point data 80 each represent a number attached to the registered point, as does the original point data 77.

The first object data 81 is data representing various parameters set for the first object 51. The second object data 82 is data representing various parameters set for the second object 52. In the present embodiment, the parameters include information representing the position of the first object 51 (or the second object 52) in the game space. In addition, the parameters may include information representing the hit point value and the ability value of the first object 51 (or the second object 52).

The path mark data 83 is data representing the position of the path mark 53. In the present embodiment, the path mark 53 is an object placed in the virtual game space, and the path mark data 83 represents the position coordinates in the game space. The position of the path mark 53 is determined based on the position of the second object 52 represented by the second object data 82.

The path display flag data 84 is data representing contents (whether it is ON or OFF) of the path display flag. The path display flag represents whether or not to display a path for moving the second object 52 therealong. That is, the path display flag is set to be ON where the path is displayed, and the path display flag is reset to be OFF where the path is not displayed.

The follow flag data 85 is data representing the contents (whether it is ON or OFF) of the follow flag. The follow flag represents whether or not the player has given an instruction for the second object 52 to follow the first object 51. That is, the follow flag is set to be ON if the player has given the instruction, and the follow flag is reset to be OFF if the player has not given the instruction.

The controlled object flag data 86 is data representing the contents (whether it is ON or OFF) of the controlled object flag. The controlled object flag represents whether the object controlled by the player is the first object 51 or the second object 52. That is, the controlled object flag is set to be ON if the object controlled by the player is the second object 52, and the controlled object flag is reset to be OFF if the object controlled by the player is the first object 51.

The action flag data 87 is data representing the contents (whether it is ON or OFF) of the action flag. The action flag represents whether or not the second object 52 is performing a mid-path action described above. That is, the action flag is set to be ON if the second object 52 is performing a mid-path action, and the action flag is reset to be OFF if the second object 52 is not performing a mid-path action.

Next, the game process to be performed in the game apparatus 1 will be described in detail with reference to FIGS. 17 to 23. FIG. 17 is a main flowchart illustrating the flow of the game process to be executed in the game apparatus 1. When the power button 14F is pressed to turn ON the game apparatus 1, the CPU 31 of the game apparatus 1 initializes the main memory 32 and other elements, and thereafter starts executing the game program 71 for performing the game process shown in FIG. 17. As the game program 71 is executed, the CPU 31 serves as various means recited in the claims. That is, the game program 71 controls the CPU 31 to serve as various means recited in the claims.

First, in step S1, the CPU 31 performs an initialization process. Specifically, a virtual game space is created, and objects (including the first and second objects 51 and 52) to appear in the game space are placed at their initial positions. Therefore, the first object data 81 stored in the main memory 32 is set so as to represent the initial position of the first object 51, and the second object data 82 is set so as to represent the initial position of the second object 52. The CPU 31 displays an image of the game space with the objects placed at their initial positions on the lower LCD 12, and displays a map image of a predetermined area including the game space on the upper LCD 22. Moreover, the CPU 31 sets initial values for various parameters and various flags to be used in the game process. The path display flag data 84 is reset to be OFF, the follow flag data 85 is reset to be OFF, the controlled object flag data 86 is reset to be OFF, and the action flag data 87 is reset to be OFF. The process of step S2 is executed, following step S1. In the following description, the process loop through steps S2 to S9 is iterated once in a predetermined amount of time (e.g., 1/60 sec).

In step S2, the CPU 31 accepts a game operation input from the player. Specifically, the CPU 31 obtains touch position data from the touch panel 13, and stores it in the main memory 32 as the touch input data 73. Note that in the present embodiment, touch position data that has been obtained in step S2 in the previous iteration is saved (stored) in the main memory 32.

In step S2, the CPU 31 further executes a process of updating the input path data 74 stored in the main memory 32. As described above, the input path data 74 represents (in the order of input) the coordinates of one or more touch positions that are inputted successively. The updating process is a process for detecting a path that has been inputted on game space image using the touch panel 13. Specifically, the CPU 31 updates the input path data 74 by the following process. First, if the touch position represented by the touch position data obtained in step S2 is a starting position of an input (if the touch position data obtained in step S2 in the previous iteration indicates that no input had been made), the CPU 31 resets the contents of the input path data 74. Specifically, the CPU 31 erases the contents of current input path data 74, and stores the touch position data obtained in step S2 as updated, new input path data 74 in the main memory 32. If the touch position represented by the touch position data obtained in step S2 is not a starting position of an input, the CPU 31 updates the input path data 74 so that this touch position is added thereto. That is, the input path data 74 is updated so as to represent contents obtained by adding the touch position represented by the touch position data obtained in step S2 to the set of one or more touch positions represented by the input path data 74 before the update. Note that if the touch position data obtained in step S2 indicates that no input has been made on the touch panel 13, the input path data 74 is not updated.

Figure 18:
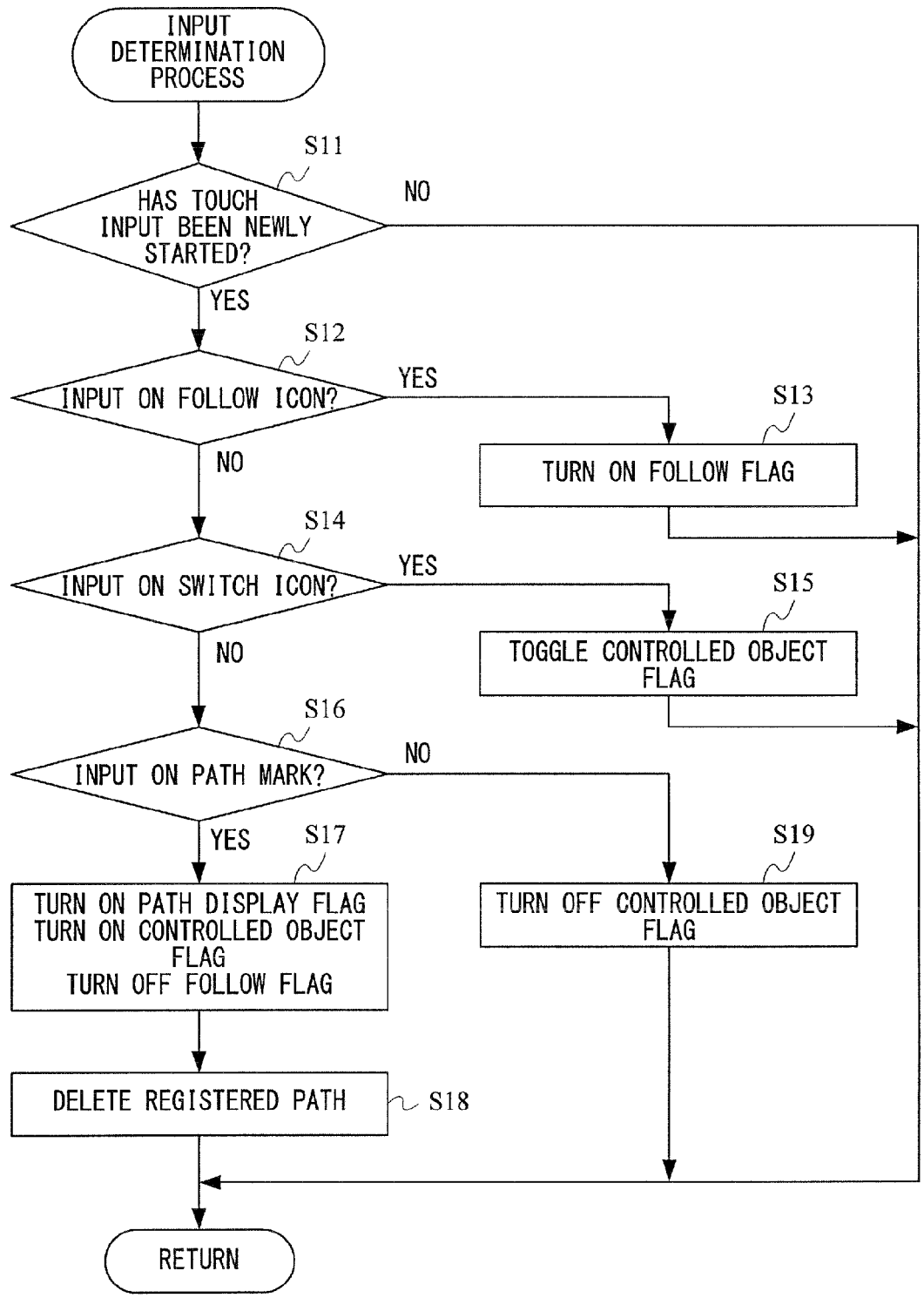
FIG. 18 is a flow chart illustrating the flow of an input determination process (step S3) shown in FIG. 17.

In step S3, following step S2, the CPU 31 executes an input determination process. The input determination process is a process of determining what instruction is intended by a touch input operation by the player (e.g., whether the input operation is one for moving the second object 52, one for controlling the first object 51 to perform an action, etc.). Referring to FIG. 18, the details of the input determination process will now be described.

FIG. 18 is a flow chart illustrating the flow of the input determination process (step S3) shown in FIG. 17. First, in step S11 of the input determination process, the CPU 31 determines whether or not a touch input has been newly started. The determination of step S11 can be made by referring to the current touch position data (the touch position data obtained in step S2 in the current iteration) and the previous touch position data (the touch position data obtained in step S2 in the previous iteration). That is, the CPU 31 determines that a touch input has been newly started if the current touch position data represents a touch position (instead of indicating that no input has been made), and if the previous touch position data indicates that no input had been made. In contrast, the CPU 31 determines that a touch input has not been newly started, if the current touch position data indicates that no input has been made, or if the previous touch position data represents a touch position. If the determination result from step S11 is affirmative, the process of step S12 is executed. If the determination result from step S11 is negative, the CPU 31 exits the input determination process.

In step S12, the CPU 31 determines whether or not an input has been made on the follow icon 55. The determination of step S12 is made based on whether or not the current touch position (the touch input starting position) is within the area of the follow icon 55 on the input screen of the touch panel 13 (the display screen of the lower LCD 12). That is, the CPU 31 reads out the touch input data 73 from the main memory 32, and determines whether or not the touch position represented by the touch input data 73 is within the area in which the follow icon 55 is displayed. Note that the area in which the follow icon 55 is displayed is predetermined. If the determination result from step S12 is affirmative, the process of step S13 is executed. If the determination result from step S12 is negative, the process of step S14 to be described later is executed.

In step S13, the CPU 31 sets the follow flag to be ON. That is, the CPU 31 updates the contents of the follow flag data 85 stored in the main memory 32 so that the flag is ON. After step S13, the CPU 31 exits the input determination process.

In step S14, the CPU 31 determines whether or not an input has been made on the switch icon 54. The determination of step S14 is made based on whether or not the current touch position is within the area of the switch icon 54 on the input screen of the touch panel 13 (the display screen of the lower LCD 12). That is, the CPU 31 reads out the touch input data 73 from the main memory 32, and determines whether or not the touch position represented by the touch input data 73 is within the area of the switch icon 54. Note that the area in which the switch icon 54 is displayed is predetermined. If the determination result from step S14 is affirmative, the process of step S15 is executed. If the determination result from step S14 is negative, the process of step S16 to be described later is executed.

In step S15, the CPU 31 toggles the controlled object flag. That is, the CPU 31 reads out the controlled object flag data 86 from the main memory 32, and updates the contents of the controlled object flag data 86 so that the flag is turned OFF if it is ON, and vice versa. After step S15, the CPU 31 exits the input determination process.

In step S16, the CPU 31 determines whether or not an input has been made on the path mark 53. The determination of step S16 is made whether or not the current touch position is within the area of the path mark 53 on the input screen of the touch panel 13 (the display screen of the lower LCD 12). The CPU 31 reads out the touch input data 73 and the path mark data 83 from the main memory 32. Then, based on the read-out data, the CPU 31 determines whether or not the current touch position is within the area in which the path mark 53 is displayed. If the determination result from step S16 is affirmative, the process of step S17 is executed. If the determination result from step S16 is negative, the process of step S19 is executed.

In step S17, the CPU 31 changes the contents of the path display flag, the follow flag and the controlled object flag. That is, the CPU 31 updates the contents of the path display flag data 84 stored in the main memory 32 so that the flag is ON. The CPU 31 updates the contents of the follow flag data 85 stored in the main memory 32 so that the flag is OFF. Moreover, the CPU 31 updates the contents of the controlled object flag data 86 stored in the main memory 32 so that the flag is ON. The process of step S18 is executed, following step S17.

In step S18, if there is a path that has been registered in step S24 to be described later, the CPU 31 deletes the path. That is, the CPU 31 deletes the registered path data 75 stored in the main memory 32. In this process, the CPU 31 also deletes the registered point data 76 together with the registered path data 75. After step S18, the CPU 31 exits the input determination process.

In step S19, the CPU 31 resets the controlled object flag to be OFF. That is, the CPU 31 updates the contents of the controlled object flag data 86 stored in the main memory 32 so that the flag is OFF. After step S19, the CPU 31 exits the input determination process.

As described above, in the input determination process, the CPU 31 determines whether or not the detected touch position is a starting position of an input (step S11), and if the touch position is a starting position of an input, the CPU 31 determines what instruction is intended by the touch input. Specifically, the CPU 31 makes the determination as follows.

1. If the input is an input on the follow icon 55, the CPU 31 determines that the input is an instruction for instructing the second object 52 to follow the first object 51, and accordingly turns ON the follow flag (step S13).

2. If the input is an input on the switch icon 54, the CPU 31 determines that the input is an instruction for switching the controlled object from one to another, and accordingly toggles the controlled object flag (step S14).

3. If the input is an input on the path mark 53, the CPU 31 determines that the input is an instruction for moving the second object 52 along a path, and accordingly turns ON the path display flag and the controlled object flag and turns OFF the follow flag (step S17).

4. Otherwise (if the input is an input on the game space image outside the path mark 53 and the icons 54 and 55), the CPU 31 determines that the input is an instruction for moving the first object 51, and accordingly turns OFF the controlled object flag (step S19).

Note that in the input determination process, the CPU 31 selects whether to control the second object 52 or to control the first object 51 based on an input by the player, depending on whether the starting position of the input is within the path mark 53. In other embodiments, the selection can be made based not on the starting position of the input, but on any input position (including a position midway through the input, and a position at the finish of the input). Specifically, the CPU 31 may execute the process through steps S12 to S19 not only when a touch input is started (YES in step S11), but also when the area where the input is made switches from one to another (e.g., when the input position switches from within the path mark 53 to outside the path mark 53). Then, if the player makes a touch input in an area outside the path mark 53 and then, without discontinuing the touch input, makes an input in the area within the path mark 53 (if the touch input is moved from the outside to the inside of the path mark 53), it can be taken to mean that the player controls the first object 51 and then continuously inputs a path for moving the second object 52 therealong. In this way, the player can control two objects with a single continuous input. Note however that there may be circumstances where the player inadvertently moves the touch input from the outside to the inside of the path mark 53. In view of such circumstances, it may be preferred to make the selection based on the starting position of the input, as in the present embodiment.

Figure 19:
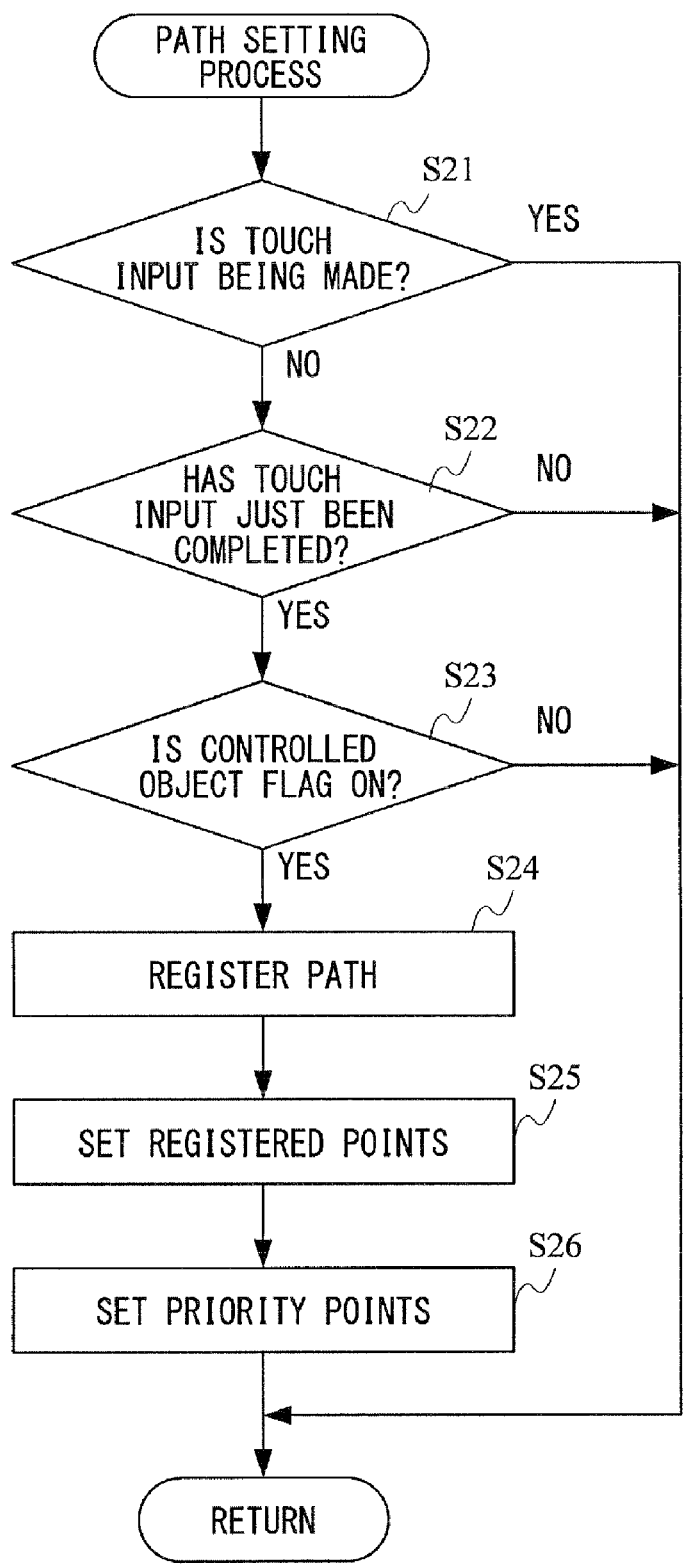
FIG. 19 is a flow chart illustrating the flow of a path setting process (step S4) shown in FIG. 17.

Referring back to FIG. 17, in step S4, following step S3, the CPU 31 executes a path setting process. The path setting process is a process for setting (registering) a path for moving the second object 52 therealong, from among paths inputted by the player. Referring to FIG. 19, the details of the path setting process will now be described.

FIG. 19 is a flow chart illustrating the flow of the path setting process (step S4) shown in FIG. 17. First, in step S21 of the path setting process, the CPU 31 determines whether or not a touch input is being made in step S2 in the current iteration. Note that the determination of step S21 can be made based on whether or not the touch input data 73 represents a touch position. If the determination result from step S21 is affirmative, the CPU 31 exits the path setting process. If the determination result from step S21 is negative, the process of step S22 is executed.

In step S22, the CPU 31 determines whether or not a touch input has just been finished. The determination of step S22 can be made by referring to the touch position data obtained in step S2 in the previous iteration. That is, the CPU 31 determines that a touch input has just been finished if the touch position data obtained in step S2 in the previous iteration represents a touch position, and determines that a touch input has not just been finished if the touch position data indicates no input had been made. If the determination result from step S22 is affirmative, the process of step S23 is executed. If the determination result from step S22 is negative, the CPU 31 exits the path setting process.

In step S23, the CPU 31 reads out, and refers to, the controlled object flag data 86 from the main memory 32, so as to determine whether or not the controlled object flag is set to be ON. The determination process of step S23 is a process of determining whether or not a path currently being inputted is a path whose starting position is within the path mark 53, or in other words, a process of determining whether or not the path is a path for moving the second object 52 therealong. If the determination result from step S23 is affirmative, the process of step S24 is executed. If the determination result from step S23 is negative, the CPU 31 exits the path setting process.

In step S24, the CPU 31 sets the path being inputted by the player as a path for moving the second object 52 therealong. Specifically, the CPU 31 reads out the input path data 74 from the main memory 32, and stores the read-out input path data 74 in the main memory 32 as the registered path data 75. The process of step S25 is executed, following step S24.

In the path setting process through steps S21 to S24 described above, an input path is registered if a touch input has just been finished (YES in step S22) and if the controlled object flag is ON (YES in step S23). That is, in the present embodiment, when an input of a path whose starting position is within the path mark 53 is finished, the path is registered.

In step S25, the CPU 31 sets registered points for the path registered in step S24. Specifically, the CPU 31 reads out the registered path data 75 from the main memory 32, and extracts touch positions at an interval of a predetermined number of positions from among all the touch positions represented by the registered path data 75. In a case where touch positions are extracted at an interval of 100 positions, for example, $1+100\,n^{th}$ (n is an integer of 0 or more) touch positions are extracted from among all the touch positions arranged in the order of input. Moreover, the CPU 31 stores in the main memory 32, as the registered point data 76, data obtained by numbering one or more extracted touch positions in the order of input. The process of step S26 is executed, following step S25.

In step S26, the CPU 31 sets priority points for the registered points set in step S25. In the present embodiment, those of the target objects that are to be event objects are set in advance, and data representing the positions of the event objects (event positions) are stored in the main memory 32. The CPU 31 determines whether or not an event position is present within a predetermined distance for each of the registered points. Note that the predetermined distance is the radius of the spherical search area to be described later. That is, the process of step S26 is a process for determining whether or not the second object 52 performs an event action when actually reaching the position of the registered point. Specifically, the CPU 31 reads out the registered path data 75 from the main memory 32, and calculates positions in the game space corresponding to the touch positions represented by the registered path data 75. Then, the CPU 31 determines whether or not an event position is present within the predetermined distance from a calculated position. Moreover, if there is a registered point from which an event position is present within the predetermined distance, the CPU 31 sets the registered point as a priority point. That is, the CPU 31 stores data representing the registered point (data representing the number attached to the registered point) as the priority point data 80 in the main memory 32. Note that in the present embodiment, if it is determined that any event position is present within the predetermined distance of more than one registered point, one of the registered points (e.g., the last registered point along the path) is set as the priority point. After step S26, the CPU 31 exits the path setting process.

Note that in the path setting process, in response to the completion of the input of a path (YES in steps S22 and S23), priority points are set for the path. Since priority points to be set along a path can be dictated once the path is determined, priority points are preferably set (stored) every time a path is inputted, as in the present embodiment. Note that although the timing for setting priority points is upon completion of the input of a path in the present embodiment, the CPU 31 may execute the process of step S26 at a timing when the second object 52 starts a mid-path action (a timing when the action flag is turned ON) or at a timing immediately before a return point determination process (S52) is executed, in other embodiments.

Referring back to FIG. 17, in step S5, following step S4, the CPU 31 determines whether or not the controlled object flag is set to be ON. The determination process of step S5 is the same as the determination process of step S22 described above. If the determination result from step S5 is negative, the process of step S6 is executed. If the determination result from step S5 is affirmative, the process of step S7 to be described later is executed.

In step S6, the CPU 31 controls the action of the first object 51 based on the player's input. In the present embodiment, the CPU 31 moves the first object 51 toward a position (in the game space) corresponding to the touch position. Specifically, the CPU 31 first reads out the first object data 81 and the touch input data 73 from the main memory 32, and calculates the position in the game space corresponding to the touch position represented by the touch input data 73. Then, the CPU 31 updates the first object data 81 so that the new position of the first object 51 is a position obtained by shifting the current position represented by the first object data 81 by a predetermined distance toward the calculated position. Data representing the updated position is stored in the main memory 32 as the first object data 81. The first object 51 can be moved at a predetermined speed by iterating the updating process described above over a plurality of frames (by iterating the process loop through steps S2 to S9 a plurality of times). The process of step S7 is executed, following the process of step S6.

In the present embodiment, the game apparatus 1 controls the action of the first object 51 based on the input made by using the touch panel 13, as in step S6. Therefore, the player can control both the first object 51 and the second object 52 using the touch panel 13. Note that in step S6, the CPU 31 executes a process of moving the first object 51 toward a position in the game space corresponding to the touch position, as an example of a process of controlling the action of the first object 51. In other embodiments, the action of the first object 51 performed based on the player's input may be any other suitable action. For example, the CPU 31 may control the first object 51 based on the shape of the path inputted by the player or the direction of the (linear) path inputted by the player.

Figure 20:
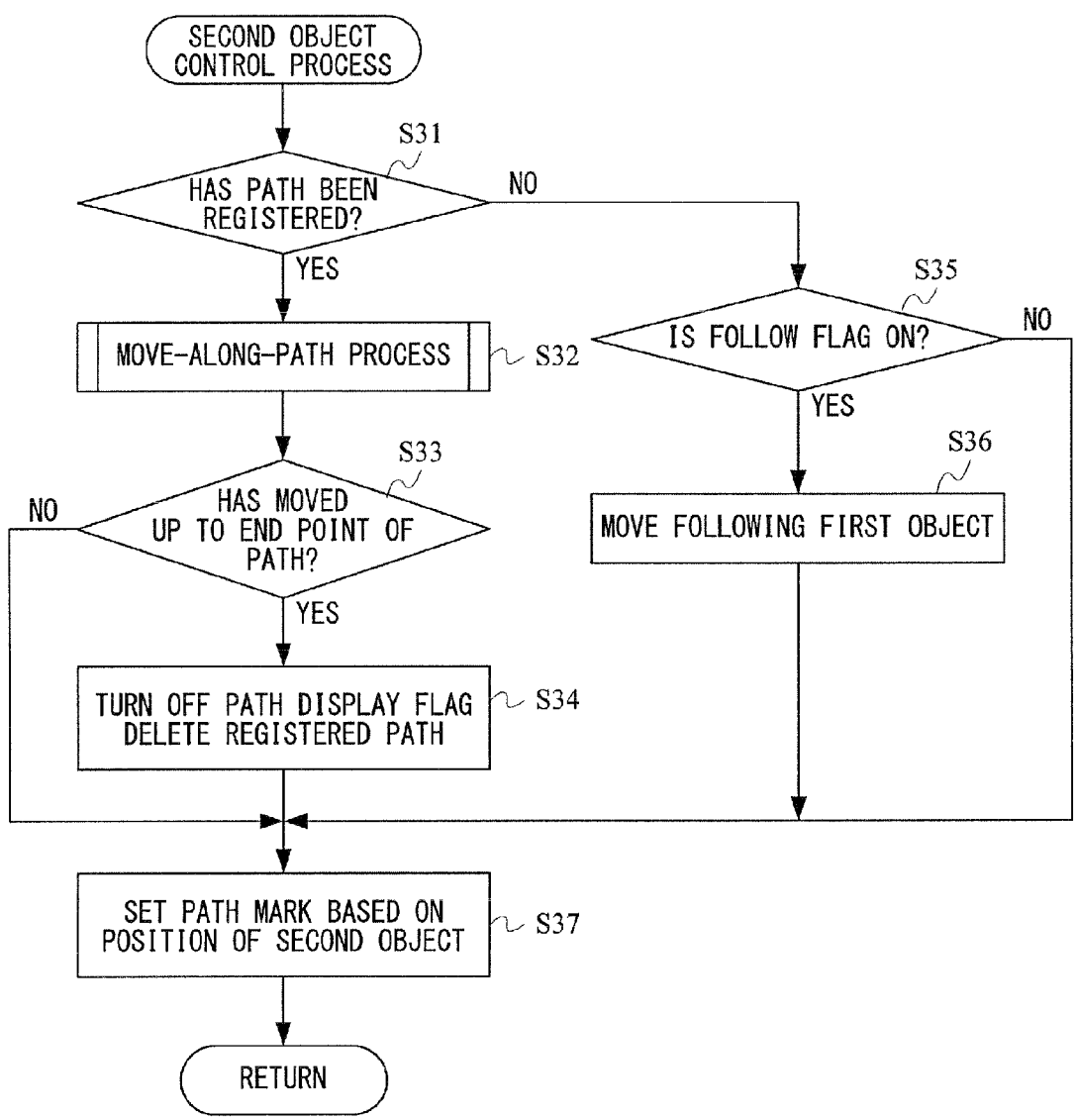
FIG. 20 is a flow chart illustrating the flow of a second object control process (step S7) shown in FIG. 17.

In step S7, the CPU 31 executes a second object control process. The second object control process is a process of controlling the movement of the second object 52 based on the player's input. Referring to FIG. 20, the details of the second object control process will now be described.

FIG. 20 is a flow chart illustrating the flow of the second object control process (step S7) shown in FIG. 17. First, in step S31 of the second object control process, the CPU 31 determines whether or not a path has been registered in (whether or not there is a registered path from) step S24 in the path setting process (step S4). The determination of step S31 can be made based on whether or not the registered path data 75 is stored in the main memory 32. If the determination result from step S31 is affirmative, the process of step S32 is executed. If the determination result from step S31 is negative, the process of step S35 to be described later is executed.

Figure 21:
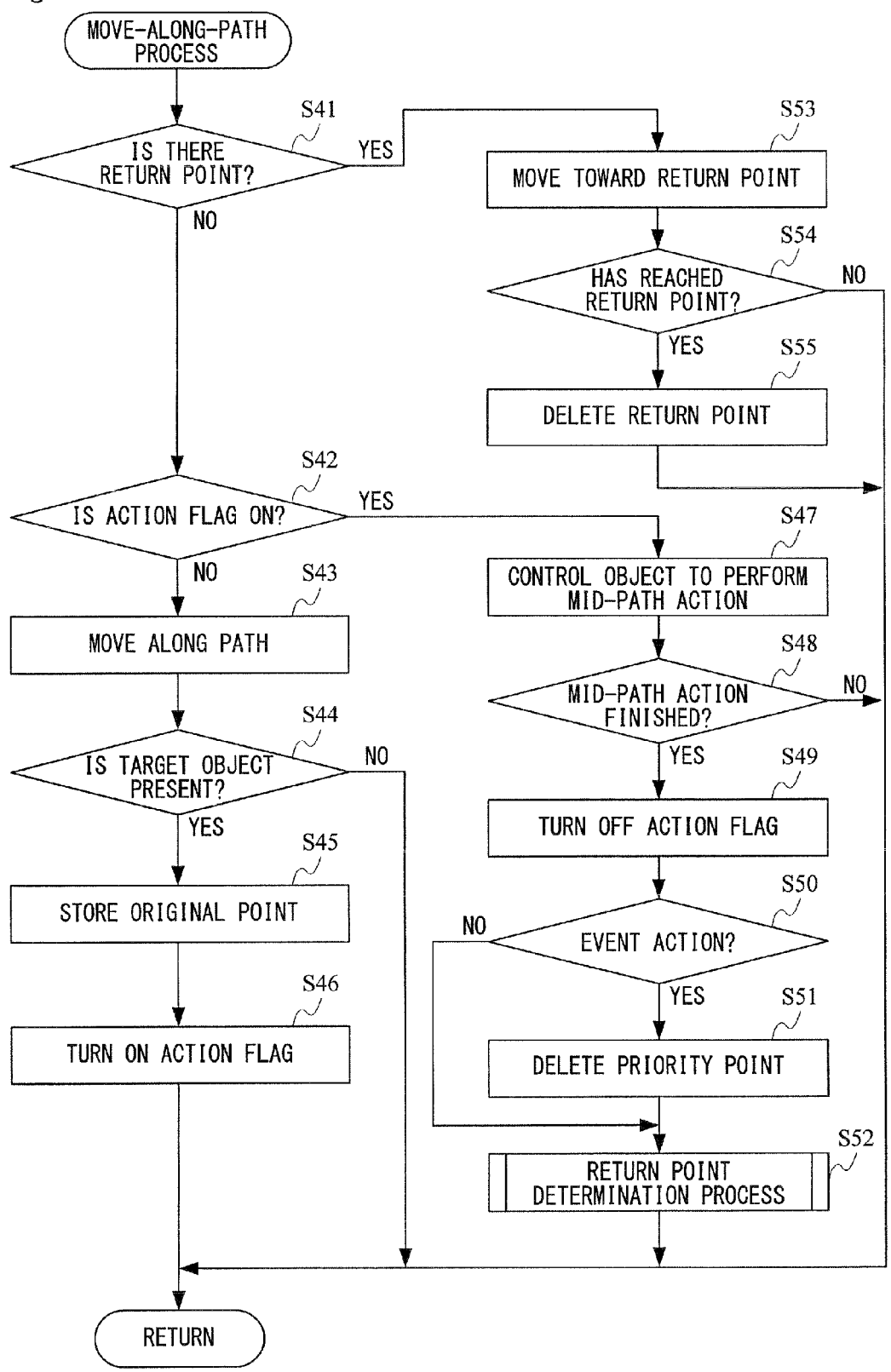
FIG. 21 is a flow chart illustrating the flow of a move-along-path process (step S32) shown in FIG. 20.

In step S32, the CPU 31 performs a move-along-path process. The move-along-path process is a process for moving the second object 52 along a path. Referring to FIG. 21, the details of the move-along-path process will now be described.

FIG. 21 is a flow chart illustrating the flow of the move-along-path process (step S32) shown in FIG. 20. First, in step S41 of the move-along-path process, the CPU 31 determines whether or not a return point has been set. In the present embodiment, a return point is set (step S52 to be described later), when the second object 52 returns to the path after finishing a mid-path action described above. That is, the process of step S41 is a process for determining whether or not the second object 52 is on the way back to the path. Specifically, the CPU 31 determines whether or not the return point data 80 is stored in the main memory 32. If the determination result from step S41 is affirmative, the process of step S42 is executed. If the determination result from step S41 is negative, the process of step S53 to be described later is executed.

In step S42, the CPU 31 reads out, and refers to, the action flag data 87 from the main memory 32, so as to determine whether or not the action flag is set to be ON. The determination process of step S42 is a process for determining whether or not the second object 52 is in the process of performing a mid-path action. If the determination result from step S42 is affirmative, the process of step S47 to be described later is executed. If the determination result from step S42 is negative, the process of step S43 is executed.

The determination result from step S42 being negative means that the second object 52 is moving along the path. Therefore, in steps S43 to S46, a process for moving the second object 52 along the path is executed. The details of this will now be described.

In step S43, the CPU 31 moves the second object 52 along the path. Specifically, the CPU 31 first reads out the second object data 82 and the registered path data 75 from the main memory 32. Then, the CPU 31 updates the position of the second object 52 represented by the second object data 82 to a position obtained by advancing the current position by a predetermined distance along the path represented by the registered path data 75 in the direction in which the path has been inputted. Data representing the updated position of the second object 52 is stored in the main memory 32 as the new second object data 82. The second object 52 can be moved along the path at a predetermined speed by iterating the updating process described above over a plurality of frames (by iterating the process loop through steps S2 to S9 a plurality of times). The process of step S44 is executed, following the process of step S43.

In step S44, the CPU 31 determines whether or not a target object is present within a search area defined with reference to the second object 52. In the present embodiment, the search area is set with respect to the second object 52. The search area is a spherical area centered about the position of the second object 52 (or the object of the path mark 53), and is not displayed on the screen. Specifically, the CPU 31 reads out the second object data 82 from the main memory 32, and determines whether or not a target object is present within a predetermined distance (within the search area) with respect to the position of the second object 52 represented by the second object data 82. If the determination result from step S44 is affirmative, the process through steps S45 and S46 is executed. If the determination result from step S44 is negative, the CPU 31 exits the move-along-path process, while skipping the process through steps S45 and S46.

The process of step S44 is a process for determining whether or not to control the second object 52 to perform a mid-path action. While the search area is a spherical area centered about the position of the second object 52 in step S44 described above, the search area may be any area as long as it is set with reference to the position of the second object 52, as are areas used in collision detection processes in general. The search area is not limited to a spherical area, but may be of, for example, a cylindrical shape, a columnar shape with fan-shaped base, and the like. If there are different objects that move along paths, the size and/or shape of the search area may vary among the objects.

In step S45, the CPU 31 stores the original point. Specifically, the CPU 31 reads out the registered point data 76 and the second object data 82 from the main memory 32. Then, the CPU 31 selects one of the registered points represented by the registered point data 76 that is prior to (or subsequent to) the position of the second object 52 represented by the second object data 82 and that is closest to that position. Data representing the selected registered point is stored in the main memory 32 as the original point data 77. The process of step S46 is executed, following step S45.

In step S46, the CPU 31 turns ON the action flag. That is, the CPU 31 updates the contents of the action flag data 87 stored in the main memory 32 so that the flag is ON. Because of the process of step S46, the determination result from step S42 will be affirmative in the move-along-path process to be executed next, and therefore the process for controlling the second object 52 to perform a mid-path action (steps S47 to S52) is executed. After step S46, the CPU 31 exits the move-along-path process.

Note that in steps S44 to S46, if a target object is present within the search area, the action flag is always ON so that the second object 52 performs amid-path action. In contrast, in other embodiments, the CPU 31 may set other conditions for performing a mid-path action. For example, conditions may be set such that the second object 52 does not perform a mid-path action if the second object 52 has a particular item (e.g., the second object 52 does not attack while carrying a rock). In contrast, conditions may be set such that the second object 52 does not perform a mid-path action if the second object 52 does not have a particular item (e.g., the second object 52 does not perform an action of opening a treasure chest if the second object 52 does not have a key).

In steps S44 to S46 described above, when the positional relationship between the position of the second object 52 and the position of another target object satisfies a predetermined condition, the CPU 31 controls the second object 52 to perform a mid-path action. In other embodiments, the condition for controlling the second object 52 to perform a mid-path action is not limited to this, and may be any other suitable condition. For example, the CPU 31 may set, in advance, a predetermined position in the game space (not limited to a position where an object is placed) at which the CPU 31 controls the second object 52 to perform a mid-path action. Then, the CPU 31 may control the second object 52 to perform a mid-path action when the positional relationship between the position of the second object 52 and the predetermined position satisfies a predetermined condition.

The determination result from step S42 being affirmative means that the second object 52 is performing a mid-path action. Therefore, through steps S47 to S52, which are executed when the determination result from step S42 is affirmative, a process for controlling the second object 52 to perform a mid-path action is executed. The details of this will now be described.

In step S47, the CPU 31 controls the second object 52 to perform a mid-path action. The specific action of the mid-path action is determined based on the type of the target object that is present within the search area at a point in time when the action flag was turned ON. For example, if the target object is an enemy object, the CPU 31 controls the second object 52 to perform an action of attacking the enemy object. If the target object is an item object, the CPU 31 controls the second object 52 to perform an action of obtaining the item, an action of carrying the item, or the like. Note that although the entire mid-path action is automatically controlled by the CPU 31 in the present embodiment, the player may be allowed to control part of the mid-path action in other embodiments. For example, regarding the action of attacking an enemy object, the action of moving toward the enemy object may be controlled by the CPU 31, with the action of swinging a sword at the enemy object being controlled by the player's input. Note that the CPU 31 controls the second object 52 to perform one frame's worth of the action in each iteration of the process of step S42. The process of step S48 is executed, following step S47 described above.

In step S48, the CPU 31 determines whether or not the mid-path action by the second object 52 is finished. In the present embodiment, the CPU 31 determines that the mid-path action is finished when the objective of the mid-path action has been achieved or when a predetermined limit amount of time has elapsed since the start of the mid-path action. Note that achieving the objective of the mid-path action means, for example, defeating an enemy object, or obtaining an item object. In the present embodiment, a time limit is set for a mid-path action, considering the possibility that the objective of a mid-path action may become no longer achievable, e.g., when an enemy object has run away. As described above, the concept of "an action by an object being finished" as used in the present specification not only includes cases where an action is finished by achieving the objective of the action, but also includes cases where the action is discontinued (without achieving the objective of the action). If the determination result from step S48 is affirmative, the process of step S49 is executed. If the determination result from step S48 is negative, the CPU 31 exits the move-along-path process.

In step S49, the CPU 31 turns OFF the action flag. That is, the CPU 31 updates the contents of the action flag data 87 stored in the main memory 32 so that the flag is OFF. Note that when the process of step S49 is executed, a return point is set by a return point determination process (step S52) to be described later. Therefore, in the move-along-path process to be executed next, the determination result from step S41 will be affirmative, and therefore the process for returning the second object 52 onto the path (steps S53 to S55) will be executed. The process of step S50 is executed, following step S49.

In step S50, the CPU 31 determines whether or not the mid-path action, which has been determined as being finished in step S48, is an event action. The determination of step S50 can be made, for example, based on the change in the status of the event object through the event action by the second object 52, e.g., the event object being deleted or moved by being obtained by the second object 52. The determination process of step S50 is a process for determining whether or not an event action has finished, i.e., whether or not the second object 52 has cleared an event. If the determination result from step S50 is affirmative, the process of step S51 is executed. If the determination result from step S50 is negative, the process of step S52 is executed, while skipping the process of step S51.

In step S51, the CPU 31 deletes a priority point. The priority point to be deleted in the process of step S51 is the priority point corresponding to an event action that has been determined in step S50 as being finished. Specifically, the CPU 31 deletes, from the main memory 32, the priority point data 80 representing the priority point to be deleted. The process of step S52 is executed, following step S51.

Figure 22:
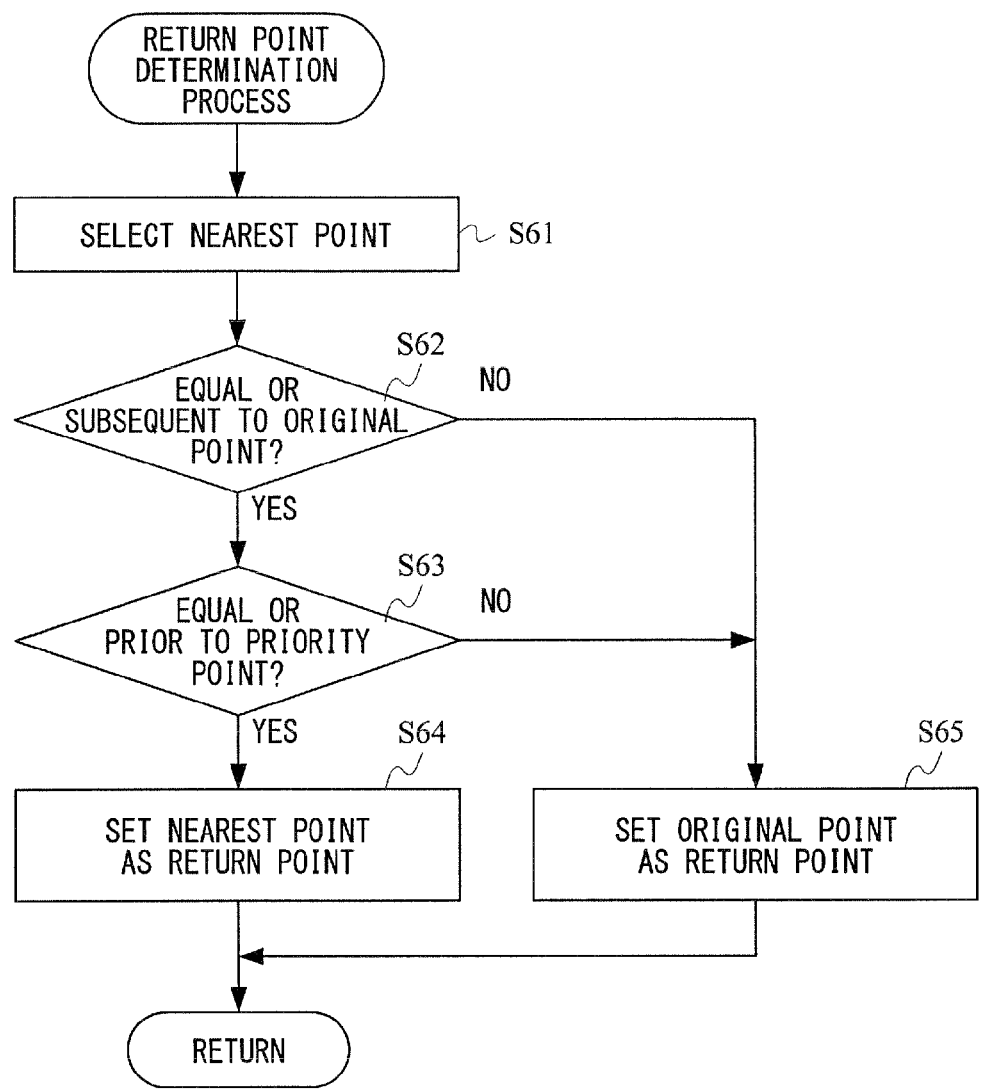
FIG. 22 is a flow chart illustrating the flow of a return point determination process (step S52) shown in FIG. 21.

In step S52, the CPU 31 performs a return point determination process. The return point determination process is a process for determining a return point selected from among the registered points. Referring to FIG. 22, the details of the return point determination process will now be described.

FIG. 22 is a flow chart illustrating the flow of the return point determination process (step S52) shown in FIG. 21. First, in step S61 of the return point determination process, the CPU 31 selects a nearest point. As described above, in the present embodiment, the nearest point is a registered point that can be reached within the shortest amount of time from the current position of the second object 52 (the position at the finish of the mid-path action). Specifically, the CPU 31 reads out the registered point data 76 and the second object data 82 from the main memory 32. Then, the CPU 31 selects one of the registered points represented by the registered point data 76 that can be reached within the shortest amount of time from the position of the second object 52 represented by the second object data 82. The specific method for selecting a registered point that can be reached within the shortest amount of time may be any suitable method. For example, the CPU 31 may first exclude any registered point such that an obstacle is present between the registered point and the position of the second object 52, and select one of the remaining registered points that is at the shortest distance from the position of the second object 52. Where the moving speed of the second object 52 varies depending on the terrain of the game space, the CPU 31 may calculate the amount of time required for moving from the position of the second object 52 to each registered point so as to select a registered point that can be reached within the shortest amount of time. Where it is presumed that no obstacle, or the like, is present in the game space, the CPU 31 may simply select one of the registered points that is at the shortest distance from the position of the second object 52. Data representing the selected registered point is stored in the main memory 32 as the nearest point data 78. The process of step S62 is executed, following step S61 described above.

In step S62, the CPU 31 determines whether or not the nearest point is a position equal or subsequent to the original point along the path. The determination of step S62 can be made easily by referring to numbers attached to the registered points. That is, the CPU 31 reads out the original point data 77 and the nearest point data 78 from the main memory 32, and determines whether the nearest point or the original point is subsequent to the other along the path by comparing the number represented by the original point data 77 with the number represented by the nearest point data 78. If the determination result from step S62 is affirmative, the process of step S63 is executed. If the determination result from step S62 is negative, the process of step S65 to be described later is executed.

In step S63, the CPU 31 determines whether or not the nearest point is a position equal or prior to a priority point along the path. As in step S62, the determination of step S63 can be made easily by referring to numbers attached to the registered points. That is, the CPU 31 reads out the nearest point data 78 and the priority point data 80 from the main memory 32, and determines whether the nearest point or the priority point is subsequent to the other along the path by comparing the number represented by the nearest point data 78 with the number represented by the priority point data 80. If the determination result from step S63 is affirmative, the process of step S64 is executed. If the determination result from step S63 is negative, the process of step S65 to be described later is executed.

In step S64, the CPU 31 sets the nearest point as the return point. That is, the contents of the nearest point data 78 stored in the main memory 32 are stored in the main memory 32 as the return point data 80. After step S64, the CPU 31 exits the return point determination process.

In step S65, the CPU 31 sets the original point as the return point. That is, the contents of the original point data 77 stored in the main memory 32 are stored in the main memory 32 as the return point data 80. After step S65, the CPU 31 exits the return point determination process.

Referring back to FIG. 21, if the determination result from step S41 described above is affirmative, the process through steps S53 to S55 is executed. The process through steps S53 to S55 is a process of returning the second object 52, having finished a mid-path action, to a position along the path. The details of this will now be described.

In step S53, the CPU 31 moves the second object 52 toward the return point. Specifically, the CPU 31 first reads out the return point data 80 and the registered point data 76 from the main memory 32, and specifies the position of the return point in the game space. Then, the CPU 31 reads out the second object data 82 from the main memory 32, and updates the position of the second object 52 represented by the second object data 82 to a position obtained by advancing the current position by a predetermined distance toward the position of the return point. Then, data representing the updated position of the second object 52 is stored in the main memory 32 as the new second object data 82. The second object 52 can be moved toward the return point at a predetermined speed by iterating the updating process described above over a plurality of frames (by iterating the process loop through steps S2 to S9 a plurality of times). The process of step S54 is executed, following the process of step S53

In step S54, the CPU 31 determines whether or not the second object 52 has reached the return point. That is, the CPU 31 reads out the second object data 82 from the main memory 32, and determines whether or not the position of the second object 52 represented by the second object data 82 coincides with the position of the return point specified in step S53. The determination process of step S54 is a process for determining whether or not the second object 52 has returned to a position along the path. If the determination result from step S54 is affirmative, the process of step S55 is executed. If the determination result from step S54 is negative, the CPU 31 exits the move-along-path process.

In step S55, the CPU 31 deletes the return point. Specifically, the CPU 31 deletes the return point data 80 from the main memory 32. Because of the process of step S55, the determination result from step S41 will be negative in the move-along-path process to be executed next. At this point, the action flag has been reset to be OFF (step S49), and therefore the determination result from step S42 will be negative. Therefore, in the move-along-path process to be executed next, the process of moving the second object 52 along the path (S43 to S46) is executed. After step S55, the CPU 31 exits the move-along-path process.

As illustrated in the move-along-path process above, in the present embodiment, if a target object is located near the second object 52 while the second object 52 is moving along the path (YES in step S44), the action flag is turned ON, and therefore the second object 52 performs a mid-path action based on the target object (step S47 via YES in step S42). Then, when the second object 52 finishes the mid-path action (YES in step S48), the action flag is turned OFF, and the return point is determined (step S52). Thus, the second object 52 moves to the return point, i.e., returns to a position along the path (step S53 via YES in step S41). Moreover, when the second object 52 returns to a position along the path (YES in step S54), the return point is deleted and the action flag is turned OFF, and thus the second object 52 resumes moving along the path (step S43 via NO in steps S41 and S42). As described above, according to the present embodiment, the second object 52 can resume moving along the path 56 even if the second object 52 performs a mid-path action away from the path 56.

In the return point determination process described above, the nearest point is determined to be the return point (step S64) if the nearest point is equal or subsequent to the original point (YES in step S62) and if the nearest point is equal or prior to the priority point (YES in step S63), i.e., if the nearest point is between the original point and the priority point. The original point is determined to be the return point (step S65) if the nearest point is prior to the original point (NO in step S62) or if the nearest point is subsequent to the priority point (NO in step S63), i.e., if the nearest point is not between the original point and the priority point. Therefore, in the present embodiment, the second object 52, having finished a mid-path action, will not return to a position prior to the original point or to a position subsequent to the priority point. Moreover, the second object 52, having finished a mid-path action, returns to a position that can be reached from the current position within the shortest amount of time, provided that the position is equal or subsequent to the original point and equal or prior to the priority point.

Note that in the return point determination process described above, the original point is determined to be the return point if the nearest point is not present between the original point and the priority point. In other embodiments, in such a case, the CPU 31 may set, as the return point, one of the registered points between the original point and the priority point that can be reached within the shortest amount of time from the position of the second object 52 at the finish of the mid-path action. That is, in the return point determination process, the CPU 31 may set, as the return point, one of the registered points equal or subsequent to the original point and equal or prior to a predetermined "end point" that can be reached within the shortest amount of time from the position at the finish of the mid-path action. Herein, the "end point" is the earliest one of priority points if a priority point or priority points are set, and is the latest registered point along the path if no priority point is set.

Note that in the move-along-path process described above, the return point is determined after a single mid-path action is finished. In other embodiments, if one mid-path action includes a plurality of sub-actions, the CPU 31 may determine the return point each time a sub-action is finished. Note that a case where one mid-path action includes a plurality of sub-actions is, for example, a case where the second object 52 performs an action of defeating a plurality of enemy objects as a mid-path action. In such a case, the CPU 31 may determine the return point each time one enemy object is defeated. Then, if the limit amount of time described above elapses before all enemy objects are defeated, the second object 52 may be moved to the latest return point determined.

Referring back to FIG. 20, the CPU 31 determines whether or not the second object 52 has moved up to the end of the path in step S33. That is, the CPU 31 reads out the second object data 82 and the registered path data 75 from the main memory 32, and determines whether or not the position of the second object 52 represented by the second object data 82 coincides with the position of the end of the path represented by the registered path data 75. If the determination result from step S33 is affirmative, the process of step S34 is executed. If the determination result from step S33 is negative, the process of step S37 to be described later is executed.

In step S34, the CPU 31 deletes the path registered in step S24 described above. The process of deleting a registered path is similar to the process of step S18 described above. The CPU 31 turns OFF the path display flag. That is, the CPU 31 updates the contents of the path display flag data 84 stored in the main memory 32 so that the flag is OFF. Therefore, when the second object 52 has moved up to the end of the path, the path is deleted by the process of step S34 and is no longer displayed. The process of step S37 to be described later is executed, following step S34.

In step S35, the CPU 31 reads out, and refers to, the follow flag data 85 from the main memory 32, so as to determine whether or not the follow flag is set to be ON. The determination process of step S35 is a process for determining whether or not an instruction for the second object 52 to follow the first object 51 has been given by the player. If the determination result from step S35 is affirmative, the process of step S36 is executed. If the determination result from step S35 is negative, the process of step S37 to be described later is executed.

In step S36, the CPU 31 moves the second object 52 so as to follow the first object 51. Specifically, the CPU 31 reads out the first object data 81 and the second object data 82 from the main memory 32, and updates the position of the second object 52 to a position obtained by shifting the current position by a predetermined distance toward the position of the first object 51. Data representing the updated position of the second object 52 is stored in the main memory 32 as the new second object data 82. Note that in the present embodiment, in order to avoid an overlap between the position of the first object 51 and that of the second object 52, the CPU 31 does not update the position of the second object 52 when the position of the first object 51 is within a predetermined distance from the second object 52. The second object 52 can be moved so as to follow the first object 51 by iterating the updating process described above over a plurality of frames (by iterating the process loop through steps S2 to S9 a plurality of times). That is, when there is an instruction to follow the first object 51, the second object 52 first moves to the position of the first object 51 (including a position near the first object 51). Moreover, if the first object 51 is moved by the first object control process (step S6), the second object 52 moves so as to follow the first object 51. The process of step S37 is executed, following step S36.

As described above, in the present embodiment, if the player makes a touch input on the follow icon 55 (YES in step S12 of FIG. 18), the follow flag is set to be ON (step S13 of FIG. 18), and as a result, the process of step S36 is executed. That is, in the present embodiment, the player can move the second object 52 so as to follow the first object 51 by touching the follow icon 55.

In the second object control process, the CPU 31 first executes the determination process of step S31, and later executes the determination process of step S35. Therefore, if the player gives an instruction for the second object 52 to follow the first object 51, and if the second object 52 is moving along the path, the process of step S32 described above is executed. That is, if such an instruction is given while the second object 52 is moving along the path, the second object 52 moves to the end of the path, and then follows the first object 51. Note that in other embodiments, if such an instruction is given while the second object 52 is moving along the path, the CPU 31 may move the second object 52 so as to follow the first object 51 while discontinuing the movement along the path.

In step S37, the CPU 31 sets the path mark 53 based on the position of the second object 52. In the present embodiment, the CPU 31 places the object of the path mark 53 at the position of the second object 52 in the game space. Specifically, the CPU 31 reads out the second object data 82 from the main memory 32, and updates the position of the object of the path mark 53 to a position determined based on the position of the second object 52. Data representing the updated position of the path mark 53 is stored in the main memory 32 as the new path mark data 83. The path mark 53 is displayed at the position of the second object 52 as the path mark data 83 is updated as described above. Note that in other embodiments, while a path for moving the second object 52 therealong is being inputted, the CPU 31 may set the path mark 53 at the position where the input is being made.

Note that the above phrase "the position determined based on the position of the second object 52" is, for example, the position of the feet of the second object 52 (see FIG. 3, etc.). Note however that the object of the path mark 53 does not need to be placed fixedly with respect to the second object 52, but the position at which the object of the path mark 53 is placed may vary depending on the condition, or the like, of the position (terrain) where the second object 52 is located. For example, although the object of the path mark 53 is placed at the feet of the second object 52 in FIG. 3 since the second object 52 is placed on the ground, the object of the path mark 53 may be placed at the position of the upper body of the second object 52 in a case where the lower body of the second object 52 is not displayed as it is submerged in water, for example. Although the CPU 31 places an object in a three-dimensional game space in order to display the path mark 53 in the present embodiment, an image representing the path mark 53 may simply be displayed while being superimposed on the game space image without placing the object in the game space, in other embodiments. After step S37, the CPU 31 exits the second object control process.

As illustrated in the process through steps S3 to S7 above, in the present embodiment, if the touch input starting position is located within the path mark 53, the controlled object flag is ON (step S17), and as a result, the CPU 31 controls the action of the first object 51 based on the touch input (step S7), while skipping the process of controlling the action of the first object 51 (step S6). If the touch input starting position is located outside the path mark 53, the controlled object flag is OFF (step S19), and as a result, the CPU 31 controls the action of the first object 51 based on the touch input (step S6). As described above, in the present embodiment, the CPU 31 determines whether the object to be controlled by the touch input is the first object 51 or the second object 52, based on whether the touch input starting position is outside or inside the path mark 53. In this way, the player does not need to perform an operation only for switching controlled objects from one to another, and therefore the player can control two objects easily. Note that in other embodiments, the CPU 31 may switch the controlled objects from one to another in response to a predetermined switching operation (e.g., an operation of pressing a predetermined operation button).

Note that in the second object control process of step S7 described above, if a path is registered, the second object 52 moves along the path (step S31, S32). In the present embodiment, a path is registered at the finish of a touch input by the player (steps S22 and S24). Therefore, in the present embodiment, the movement of the second object 52 is started at the finish (completion) of a touch input. In the first object control process of step S6 described above, the action of the first object 51 is controlled in response to any touch input being made. That is, the first object 51 performs an action each time a touch input is made, whereas the second object 52 performs an action (or moves) each time a path input is completed. Since the second object 52 performs an action (or moves) upon completion of an input, the first object 51 can be controlled to perform an action while the second object 52 is moving in the present embodiment. In this way, two objects will be performing actions at the same time, and thus the game apparatus 1 can make the player feel as if the player were controlling two objects at the same time. Note that in other embodiments, the CPU 31 may start the movement of the second object 52 before the finish of a touch input. For example, the movement of the second object 52 may be started in response to a touch input starting from a position within the path mark 53, or after the passage of a predetermined amount of time since the start of the touch input. The CPU 31 may control the first object 51 to perform an action each time an input of a path on the input device is completed (in a case where the first object 51 is controlled to perform an action along a path).

In the game process of the present embodiment, when a new input is made on the path mark 53 (YES in step S16 of FIG. 18), the existing registered path is deleted (step S18 of FIG. 18). As shown in the second object control process described above, if the registered path is deleted (NO in step S31), the process of moving the second object 52 along the path (step S32) is not executed, and the second object 52 stops moving along the path. Moreover, if a new path is inputted and registered through the new input (YES in step S32), the second object 52 starts moving along the new path (step S32). Therefore, in the present embodiment, if the player newly inputs a different path while the second object 52 is moving along a path, the second object 52 moves along the new path. That is, in the present embodiment, the player can change the path while the second object 52 is moving along the path. Therefore, in the present embodiment, if the player inadvertently inputs an unintended path, the player can readily correct the path.

Figure 23:
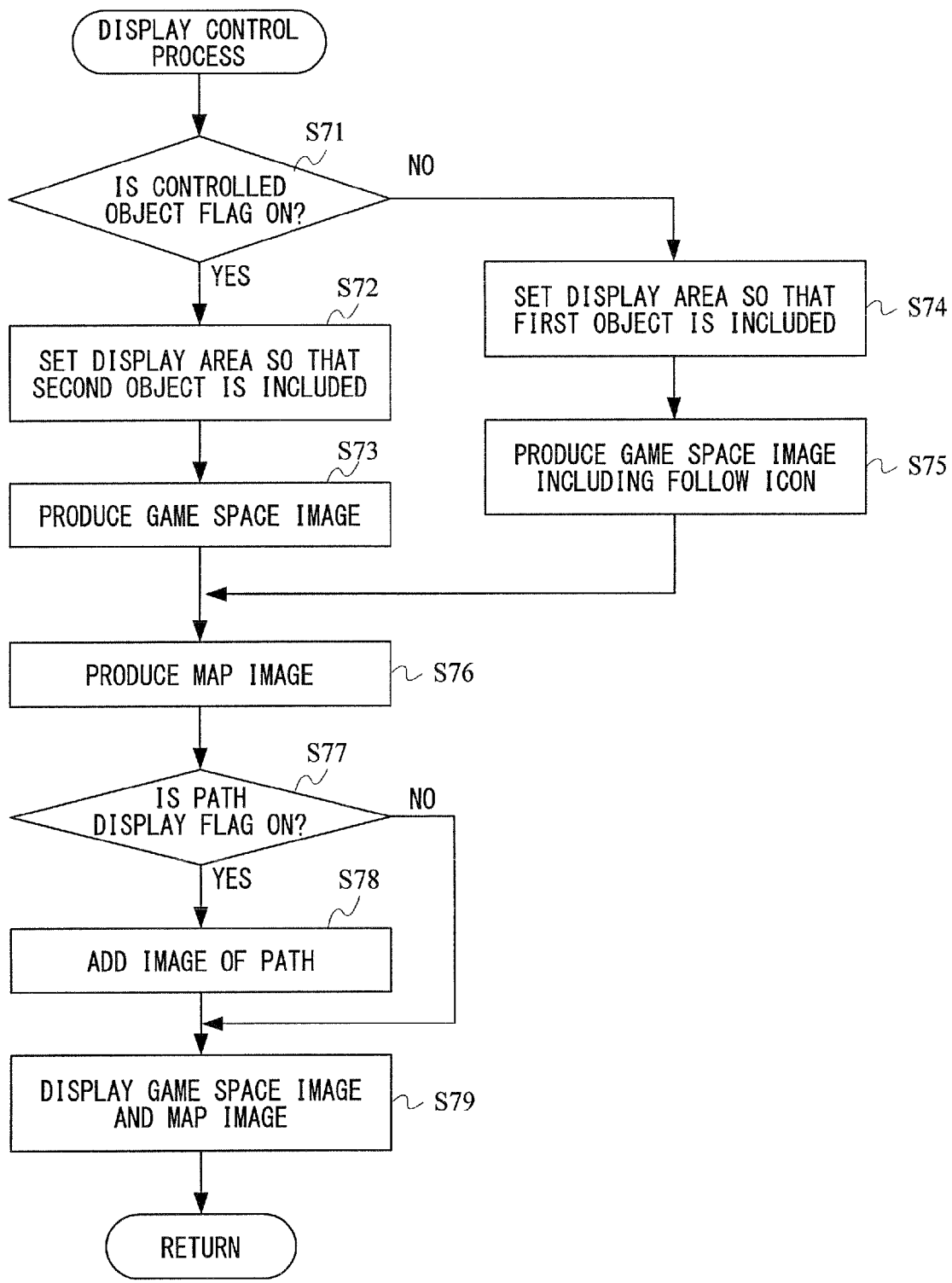
FIG. 23 is a flow chart illustrating the flow of a display control process (step S8) shown in FIG. 17.

Referring back to FIG. 17, in step S8, following step S7, the CPU 31 executes a display control process. The display control process is a process of displaying a game image on the lower LCD 12 and the upper LCD 22. Referring to FIG. 23, the details of the display control process will now be described.

FIG. 23 is a flow chart illustrating the flow of the display control process (step S8) shown in FIG. 17. First, in step S71 of the display control process, the CPU 31 determines whether or not the controlled object flag is set to be ON. The determination process of step S71 is the same as the determination process of step S22 described above. If the determination result from step S71 is affirmative, the process through steps S72 and S73 is executed. If the determination result from step S71 is negative, the process through steps S74 and S75 to be described later is executed.

In step S72, the CPU 31 sets the display area of the game space image so that the second object 52 is included therein. The display area of the game space image refers to an area of the game space that should be displayed on the lower LCD 12 as the game space image. Specifically, the CPU 31 reads out the second object data 82 from the main memory 32, and sets a display area of a predetermined area based on the position of the second object 52. Typically, the display area is set so that the position of the second object 52 is generally at the center of the display area. The process of step S73 is executed, following step S72.

In step S73, the CPU 31 produces a game space image representing the game space in the display area set in step S72. That is, the CPU 31 produces an image of the game space in the display area as viewed from a predetermined viewing position. Since the second object 52 and the object of the path mark 53 are placed in the game space in the display area, the game space image at least includes the second object 52 and the path mark 53. Note that if the first object 51 is present around the second object 52, the first object 51 is also included in the game space image. The produced game space image is rendered in the first VRAM 47. Moreover, the CPU 31 renders the image of the switch icon 54, superimposed on the game space image rendered in the first VRAM 47. The process of step S76 to be described later is executed, following step S73.

In step S74, the CPU 31 sets the display area of the game space image so that the first object 51 is included. Specifically, the CPU 31 reads out the first object data 81 from the main memory 32, and sets a display area of a predetermined area based on the position of the first object 51. Also in step S74, as in step S72 described above, the display area is typically set so that the position of the first object 51 is generally at the center of the display area. The process of step S75 is executed, following step S74.

In step S75, the CPU 31 produces a game space image representing the game space in the display area set in step S74. The process of producing a game space image in step S75 is similar to the process in step S73, except that the position of the display area is different. The game space image produced in step S75 at least includes the first object 51. Note that if the second object 52 is present around the first object 51, the second object 52 and the path mark 53 are also included in the game space image. As in step S73, the produced game space image is rendered in the first VRAM 47. Moreover, in step S75, the CPU 31 renders the images of the switch icon 54 and the follow icon 55, superimposed on the game space image rendered in the first VRAM 47. The process of step S76 is executed, following step S75.

As in steps S72 to S75 described above, in the present embodiment, the display area is set (step S72) so that the second object 52 is included in the game space image when the controlled object flag is ON (YES in step S71), whereas the display area is set (step S74) so that the second object 52 is included in the game space image when the controlled object flag is OFF (YES in step S71). The controlled object flag is toggled between ON and OFF when a touch input is made on the switch icon 54 (step S15 of FIG. 18). Therefore, by making a touch input on the switch icon 54, the player can easily switch between a mode where at least the first object 51 is displayed and a mode where at least the second object 52 is displayed.

As in steps S73 and S75 described above, in the present embodiment, the CPU 31 displays the path mark 53, superimposed on the second object 52. As described above, the object to be controlled by the touch input varies depending on whether the touch input starting position is outside or inside a predetermined designated area (the area of the path mark 53). That is, the path mark 53 is displayed so as to present to the player, in an easy-to-understand manner, a designated area based on which either one of the two objects is controlled by the touch input.

As in steps S73 and S75 described above, in the present embodiment, the CPU 31 displays the follow icon 55 only when the controlled object flag is OFF (NO in step S71). The controlled object flag is ON when a touch input is made starting from a position within the path mark 53 (step S17 of FIG. 18), and is OFF when a touch input is made starting from a position outside the path mark 53 (step S19 of FIG. 18). That is, in the present embodiment, the follow icon 55 is not displayed during a period in which a touch input is being made starting from a position within the path mark 53, i.e., during a period in which a touch input for moving the second object 52 therealong is being made. This is because it is assumed that during such a period, the player is controlling the second object 52 to move along a path, and thus does not need the follow icon 55 (the player will not touch the follow icon 55).

In step S76, the CPU 31 produces a map image. Although the specific method for producing a map image may be any suitable method, in the present embodiment, a two-dimensional full-length map image representing the entire game space is prepared in advance, and the CPU 31 produces a map image by selecting an area of the full-length map image to be displayed. The area to be displayed as the map image is preferably selected so that both the first object 51 and the second object 52 are included. The map image produced as described above is rendered in the second VRAM 48. Moreover, the CPU 31 renders the mark 61 representing the first object 51 and the mark 62 representing the second object 52, superimposed on the map image rendered in the second VRAM 48. The process of step S77 is executed, following step S76.

In step S77, the CPU 31 reads out, and refers to, the path display flag data 84 from the main memory 32, so as to determine whether or not the path display flag is set to be ON. The determination process of step S77 is a process of determining whether or not there exists a path that should be displayed on the screen (i.e., a path being inputted for moving the second object 52 therealong, or a registered path). If the determination result from step S77 is affirmative, the process of step S78 is executed. If the determination result from step S77 is negative, the process of step S79 to be described later is executed, while skipping the process of step S78.

In step S78, the CPU 31 adds an image of a path for moving the second object 52 therealong on each of the images displayed on the LCDs 12 and 22. In the present embodiment, the game space image displayed on the lower LCD 12 is an image representing the three-dimensional game space, whereas the map image displayed on the upper LCD 22 is an image representing a two-dimensional plane. The game space image and the map image described above differ from each other in terms of the size of the area in the game space represented. Therefore, the CPU 31 produces the image of a path (first path image) displayed on the lower LCD 12, and the image of a path (second path image) displayed on the upper LCD 22, superimposed on the map image.

The first path image and the second path image described above are produced by using the registered path data 75 (or the input path data 74). Specifically, the CPU 31 reads out the registered path data 75 from the main memory 32, and produces, as the first path image, an image of a line that connects together, in the order of input, the coordinates of one or more touch positions represented by the registered path data 75. For the second path image, the CPU 31 calculates the position on the ground (in the game space) for each of one or more touch positions represented by the registered path data 75, and produces an image of a line that connects together the calculated positions. Then, it is possible to obtain the second path image by shrinking the produced line image in accordance with the size of the map image. Note that in other embodiments, the CPU 31 may produce the second path image by applying a predetermined deformation (e.g., a deformation in which an image is longitudinally elongated) on the first path image. Where the shape of the first path image is close to that of the second path image, e.g., where the game space image is an image of the game space as viewed generally from straight above, the CPU 31 may produce the second path image by simply shrinking the first path image. Thus, the second path image can be produced through a simple process.

If the registered path data 75 is not stored in the main memory 32, the first path image and the second path image described above are produced by using the input path data 74. The method of producing path images in this case is similar to the production method described above, except that the input path data 74 is used instead of the registered path data 75. Note that the CPU 31 may vary the color and/or the shape of the path image depending on whether the registered path data 75 or the input path data 74 is used. In this way, the player can clearly distinguish between a path being inputted (a path represented by the input path data 74) and a path that has been inputted (a path represented by the registered path data 75).

The CPU 31 renders the first path image produced as described above, superimposed on the game space image rendered in the first VRAM 47. The CPU 31 renders the second path image described above, superimposed on the map image rendered in the second VRAM 48. The process of step S79 is executed, following step S78.

As in step S78 described above, in the present embodiment, the image of an inputted path is displayed not only in the game space image displayed on the lower LCD 12, but also in the map image displayed on the upper LCD 22. Thus, the player can visually check inputted paths even on the map image, which represents a larger area than the game space image on which the player makes touch inputs, thereby further facilitating the path inputting operation.

In other embodiments, when a path inputted by the player is displayed on the screen, the CPU 31 may display an image representing the priority point on the screen, in addition to the image of the path. The CPU 31 may vary the line color, the line thickness and/or the line type (e.g., dotted or solid), etc., between a portion of a whole path that has been passed by the second object 52 and a portion that has not been passed by the second object 52.

In step S79, the CPU 31 displays the game space image and the map image on the LCDs 12 and 22, respectively. That is, the CPU 31 displays the game space image rendered in the first VRAM 47 on the lower LCD 12, and the map image rendered in the second VRAM 48 on the upper LCD 22. After step S79, the CPU 31 exits the display control process.

Referring back to FIG. 17, in step S9, following step S8, the CPU 31 determines whether or not the game should be terminated. The determination of step S9 is made based on, for example, whether or not the game has been cleared, the game has been over, or the player has given an instruction to quit the game. If the determination result from step S9 is negative, the process of step S2 is executed again. The process loop through steps S2 to S9 is repeated until it is determined in step S9 that the game should be terminated. If the determination result from step S9 is affirmative, the CPU 31 exits the game process shown in FIG. 17. The game process is as described above.

As described above, in the game process of the present embodiment, the game apparatus 1 accepts an input of a path for moving the second object 52 therealong, not on the map image but on the game space image. In this way, the player can control an object looking at the game space image whether the player is controlling the first object 51 or the second object 52. Therefore, in the present embodiment, the player can easily perform an operation of inputting a path, without having to switch the screen from the map image to the game space image.

[Variations]

In the embodiment described above, the game apparatus 1 includes two screens (the lower LCD 12 and the upper LCD 22), and displays the game space image and the map image at the same time. In other embodiments, the game apparatus 1 does not have to display the map image. Even when the map image is displayed, the game apparatus 1 does not need to display the game space image and the map image at the same time, but may selectively display one of the images on a single display screen. Note that while the game space image represents a partial area of a three-dimensional game space in the embodiment described above, the game space image may represent a two-dimensional game space or may represent the whole of the game space. While the map image represents a two-dimensional plane in the embodiment described above, the map image may be any suitable type of image that represents a larger area than the game space image, and may represent a three-dimensional game space.

The embodiment described above has been directed to an example of the game apparatus 1, which includes the touch panel 13 as an input device (pointing device) with which it is possible to specify a position on the screen of the display device. In other embodiments, the input device with which it is possible to specify a position on the screen of the display device may be a pointing device such as a mouse or a touch pad. The present invention can also be applicable to a system in which the orientation of an input device is detected by the use of a camera and/or an acceleration sensor, and the position on the display screen that is being pointed by the input device is calculated based on the orientation.

The embodiment described above has been directed to an example where the game apparatus 1 controls the action of the first object 51 based on the touch input on the touch panel 13. In other embodiments, the action of the first object 51 may be controlled not only by the touch input by the player, but also by an input made through an operation button and/or a sound input made through a microphone 43, instead of, or in addition to, the touch input.

Note that in a game apparatus employing an input system through which the player can freely input a path on the screen, as in the embodiment described above, a path may be inputted in an area where the second object 52 cannot be moved. For example, even if a path is inputted, extending across a wall displayed on the screen, the second object 52 cannot move across the wall. In view of such cases, the game apparatus 1 may perform the following process in the game process described above. That is, when the second object 52 can no longer be moved along a path, the game apparatus 1 may stop moving the second object 52 and erase the path. Specifically, in step S43 described above, the CPU 31 determines whether or not the second object 52 can move along the path, and if the second object 52 cannot be moved, the second object 52 is not moved. Moreover, the registered path data 75 and the registered point data 76 stored in the main memory 32 are erased. In the return point determination process of step S52 described above, if the nearest point selected in step S61 is a position that the second object 52 cannot enter, the CPU 31 may determine the original point to be the return point (irrespective of the determination results from steps S62 and 563).

In the embodiment described above, the game apparatus 1 sets registered points along a path inputted by the player (step S25) in order to simplify the process of determining the return point. In other embodiments, the game apparatus 1 may set no registered points, and may determine a position (return position) to which the second object 52 is returned when a mid-path action is finished, from among all points of the path. Then, the original point, the nearest point and the priority point described above are also determined from among all points of the path, as with the return point. Specifically, the original point is then the position of the second object 52 at the start of the mid-path action. The nearest point is the position of a point, from among all points of the path, that can be reached within the shortest amount of time from the position of the second object 52 at the finish of the mid-path action. The priority point is a position at which the second object 52 performs an event action, from among all points along the path.

The present invention is applicable to, for example, a game program or a game apparatus, aiming at, for example, allowing the player to easily perform an operation in which an object is moved by using a path on the screen.

While the invention has been described in detail, the foregoing description is in all aspects illustrative and not restrictive. It is understood that numerous other modifications and variations can be devised without departing from the scope of the invention.

What is claimed is:

1. A game apparatus having an input device with which it is possible to specify a position on a screen of a display device, the game apparatus comprising:
  a display control unit for displaying a game image with a first object and a second object, the game image representing a virtual game space on the display device;

a designated area setting unit for setting a designated area in association with the second object in the game image, the designated area being partially located on the second object in the game image;

an input detection unit for detecting an input made on the game image by using the input device; and an input determining unit for determining whether the detected input is either a pointing input made on the game image at a position located outside the designated area, or a path input drawn on the game image to at least partially extend through the designated area, wherein if the detected input is the pointing input, controlling an action of the first object in the game image based on the pointing input made on the game image by using the input device, and if the detected input is the path input, controlling an action of the second object in the game image to move along a path based on the path input drawn on the game image by using the input device.

2. A non-transitory computer-readable storage medium having stored therein a game program to be executed by a computer in a game apparatus including an input device with which it is possible to specify a position on a screen of a display device, the program causing the computer to execute functionality comprising:

displaying a game image with a first object and a second object, the game image representing a virtual game space on the display device;

setting a designated area in association with the second object in the game image, the designated area being partially located on the second object in the game image;

detecting an input made on the game image by using the input device; and determining whether the detected input is either a pointing input made on the game image at a position located outside the designated area, or a path input drawn on the game image to at least partially extend through the designated area, wherein if the detected input is the pointing input, controlling an action of the first object in the game image based on the pointing input made on the game image by using the input device, and if the detected input is the path input, controlling an action of the second object in the game image to move along a path based on the path input drawn on the game image by using the input device.

3. The non-transitory computer readable storage medium according to claim 1, wherein the game program causes the computer to further execute functionality comprising displaying the path superimposed on the game image.

4. The non-transitory computer readable storage medium according to claim 3, wherein the game program causes the computer to further execute functionality comprising displaying an image representing the designated area superimposed on an image of the second object in the game image.

5. The non-transitory computer readable storage medium according to claim 3, wherein:

the designated area is moved together with the second object, based on the path input; and if a new path input starting from a position within the designated area is made by using the input device while the second object is moving along the path, the second object is moved along a new path based on the new path input.

6. The non-transitory computer readable storage medium according to claim 1, wherein the game program causes the computer to further execute functionality comprising moving the first object based on the pointing input made on the game image by using the input device.

7. The non-transitory computer readable storage medium according to claim 1, wherein:

the first object is controlled to perform the action each time the pointing input made on the game image by using the input device is detected; and the second object is moved each time the path input is completed.

8. The non-transitory computer readable storage medium according to claim 1, wherein if a predetermined instruction is given by a player, the movement of the second object is controlled based on a position of the first object.

9. The non-transitory computer readable storage medium according to claim 8, wherein if the predetermined instruction is given by the player, the second object is moved to the position of the first object, and then the second object is moved so as to follow the first object.

10. The non-transitory computer readable storage medium according to claim 8, wherein:

a predetermined image is displayed on the game image so that the predetermined image is erased at least while the path input starting from a position within the designated area is being made on the game image; and the movement of the second object is controlled by using the path input made by the input device at a position of the predetermined image as the predetermined instruction.

11. The non-transitory computer readable storage medium according to claim 1, wherein, based on an instruction from a player, switching occurs between a state where a display area of a virtual game space is set so that the first object is included in the game image and another state where the display area is set so that the second object is included in the game image.

12. The non-transitory computer readable storage medium according to claim 1, wherein one of, or simultaneously both of, the game image and a wide-area image representing a larger area than an area of a game space represented by the game image, is displayed on the display device.

13. The non-transitory computer readable storage medium according to claim 12, wherein the game program causes the computer to further execute functionality comprising displaying the path superimposed on the wide-area image.

14. A game system, comprising:

an input device configured to specify a position on a screen of a display device; and a game apparatus having the display device and one or more processors, the game apparatus comprising:

a display control unit for displaying a game image with a first object and a second object, the game image representing a virtual game space on the display device, a designated area setting unit for setting a designated area in association with the second object in the game image, the designated area being partially located on the second object in the game image, an input detection unit for detecting an input made on the game image by using the input device, and an input determining unit for determining whether the detected input is either a pointing input made on the game image at a position located outside the designated area, or a path input drawn on the game image to at least partially extend through the designated area, wherein if the detected input is the pointing input, controlling an action of the first object in the game image based on the pointing input made on the game image by using the input device, and if the detected input is the path input, controlling an action of the second object in the game image to move along a path based on the path input drawn on the game image by using the input device.

15. A method implemented in a computer in a game apparatus having one or more processors and including an input device with which it is possible to specify a position on a screen of a display device, the method comprising:

displaying a game image with a first object and a second object, the game image representing a virtual game space on the display device;

setting a designated area in association with the second object in the game image, the designated area being partially located on the second object in the game image;

detecting an input made on the game image by using the input device; and determining whether the detected input is either a pointing input made on the game image at a position located outside the designated area, or a path input drawn on the game image to at least partially extend through the designated area, wherein if the detected input is the pointing input, controlling an action of the first object in the game image based on the pointing input made on the game image by using the input device, and if the detected input is the path input, controlling an action of the second object in the game image to move along a path based on the path input drawn on the game image by using the input device.

* * * * *